(12) United States Patent
Ishibashi et al.

(10) Patent No.: US 9,929,570 B2
(45) Date of Patent: Mar. 27, 2018

(54) CONTROL APPARATUS TO CONTROL DISCHARGE FROM BATTERY UNITS

(71) Applicant: SONY CORPORATION, Tokyo (JP)

(72) Inventors: Yoshihito Ishibashi, Tokyo (JP); Junichi Sawada, Tokyo (JP); Rui Kamada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1131 days.

(21) Appl. No.: 13/665,442

(22) Filed: Oct. 31, 2012

(65) Prior Publication Data

US 2013/0113437 A1 May 9, 2013

(30) Foreign Application Priority Data

Nov. 7, 2011 (JP) ................. 2011-243964

(51) Int. Cl.
| H02J 7/00 | (2006.01) |
| G05F 1/67 | (2006.01) |
| H02J 7/35 | (2006.01) |
| H02J 1/10 | (2006.01) |

(52) U.S. Cl.
CPC ............ *H02J 7/00* (2013.01); *G05F 1/67* (2013.01); *H02J 7/008* (2013.01); *H02J 7/35* (2013.01); *H02J 1/108* (2013.01); *H02J 7/0063* (2013.01); *H02J 2007/0067* (2013.01); *Y02E 10/58* (2013.01); *Y02E 10/766* (2013.01)

(58) Field of Classification Search
CPC .............. H02J 7/0063; H02J 2007/006; Y02T 10/7005
USPC ............................................. 320/136
See application file for complete search history.

(56) References Cited

U.S. PATENT DOCUMENTS

| 4,849,681 | A | * | 7/1989 | Munnig Schmidt | G01R 19/16542 320/133 |
| 5,666,040 | A | * | 9/1997 | Bourbeau | H01M 2/348 320/118 |
| 5,684,386 | A | * | 11/1997 | Okada | H01M 10/44 320/139 |
| 5,714,867 | A | * | 2/1998 | Pizzi | H02J 7/0029 320/127 |
| 5,796,103 | A | * | 8/1998 | Sakai | G03G 15/0266 250/324 |
| 5,998,968 | A | * | 12/1999 | Pittman | H02J 7/0093 320/130 |
| 6,236,214 | B1 | * | 5/2001 | Camp, Jr. | G01R 31/3648 320/132 |
| 6,252,373 | B1 | * | 6/2001 | Stefansson | H02J 7/0093 320/106 |

(Continued)

FOREIGN PATENT DOCUMENTS

| EP | 0758104 | A1 | * | 2/1997 | ......... | G03G 15/0266 |
| EP | 1164439 | A2 | * | 12/2001 | ......... | G03G 15/0266 |

(Continued)

*Primary Examiner* — Drew A Dunn
*Assistant Examiner* — John Trischler
(74) *Attorney, Agent, or Firm* — Chip Law Group

(57) ABSTRACT

Disclosed herein is a control apparatus, including: a discrimination section configured to discriminate a plurality of battery units which are to share and output electric power required by a load; and a control section configured to carry out discharge control for the battery units in response to a situation of each of batteries which the battery units individually have.

12 Claims, 15 Drawing Sheets

(56) References Cited

U.S. PATENT DOCUMENTS

| | | | | |
|---|---|---|---|---|
| 6,861,373 B2* | 3/2005 | Aoki | G03G 5/08278 | 427/569 |
| 7,051,671 B2* | 5/2006 | Aoki | G03G 5/08278 | 118/723 E |
| 7,514,820 B2* | 4/2009 | MacDougall | H03K 3/53 | 307/108 |
| 7,584,813 B2* | 9/2009 | Yoshida | B60K 6/48 | 180/65.285 |
| 7,933,694 B2* | 4/2011 | Kato | B60K 6/365 | 180/65.22 |
| 7,952,224 B2* | 5/2011 | Sawada | B60L 7/14 | 307/19 |
| 7,953,525 B2* | 5/2011 | Oyobe | B60L 11/1868 | 180/65.1 |
| 7,986,128 B2* | 7/2011 | Kubota | H02J 7/0004 | 320/106 |
| 8,053,921 B2* | 11/2011 | Ichikawa | B60L 11/1868 | 307/9.1 |
| 8,089,177 B2* | 1/2012 | Kato | B60K 6/365 | 307/10.1 |
| 8,143,851 B2* | 3/2012 | Greening | G06F 1/189 | 320/116 |
| 8,228,040 B2* | 7/2012 | Utsumi | H01M 10/4207 | 320/116 |
| 8,229,616 B2* | 7/2012 | Aridome | B60K 6/365 | 180/65.265 |
| 8,330,417 B2* | 12/2012 | Athas | G06F 1/189 | 320/117 |
| 8,405,001 B2* | 3/2013 | Albrecht | B23K 9/1006 | 219/108 |
| 8,423,210 B2* | 4/2013 | Kato | B60K 6/445 | 180/65.1 |
| 8,436,575 B2* | 5/2013 | Sim | H01M 10/482 | 320/106 |
| 8,442,727 B2* | 5/2013 | Yamamoto | B60K 6/365 | 320/109 |
| 8,473,136 B2* | 6/2013 | Kato | B60W 10/26 | 180/65.21 |
| 8,521,459 B2* | 8/2013 | Watanabe | G01R 31/3679 | 702/65 |
| 8,594,873 B2* | 11/2013 | Kimura | B60L 11/1811 | 318/139 |
| 8,620,504 B2* | 12/2013 | Komata | B60K 6/365 | 180/65.31 |
| 8,683,244 B2* | 3/2014 | Minegishi | B60K 6/445 | 320/130 |
| 8,718,847 B2* | 5/2014 | Itagaki | B60K 6/445 | 701/22 |
| 8,723,457 B2* | 5/2014 | Komatsu | B60K 6/365 | 180/65.1 |
| 8,901,889 B2* | 12/2014 | Ishibashi | H02J 7/0063 | 320/118 |
| 8,957,636 B2* | 2/2015 | Ochiai | B60L 3/0046 | 320/118 |
| 9,007,024 B2* | 4/2015 | Li | H02J 7/0013 | 320/124 |
| 9,106,104 B2* | 8/2015 | Kinjo | H02J 3/32 | |
| 9,506,990 B2* | 11/2016 | Stewart | G01R 31/025 | |
| 2003/0049558 A1* | 3/2003 | Aoki | G03G 5/08278 | 430/128 |
| 2003/0062872 A1* | 4/2003 | Brotto | H01M 10/425 | 320/106 |
| 2003/0189418 A1* | 10/2003 | Schinner | G01R 31/3648 | 320/136 |
| 2004/0232415 A1* | 11/2004 | Aoki | G03G 5/08278 | 257/53 |
| 2008/0122400 A1* | 5/2008 | Kubota | H02J 7/0004 | 320/106 |
| 2009/0261658 A1* | 10/2009 | Kato | B60W 20/13 | 307/82 |
| 2009/0295330 A1* | 12/2009 | Li | H02J 7/0013 | 320/124 |
| 2010/0019732 A1* | 1/2010 | Utsumi | H01M 10/4207 | 320/136 |
| 2010/0065351 A1* | 3/2010 | Ichikawa | B60L 11/1868 | 180/65.8 |
| 2010/0094497 A1* | 4/2010 | Oyobe | B60L 11/1868 | 701/22 |
| 2010/0096918 A1* | 4/2010 | Sawada | B60L 11/123 | 307/9.1 |
| 2010/0100264 A1* | 4/2010 | Kato | B60W 20/13 | 701/22 |
| 2010/0100265 A1* | 4/2010 | Kato | B60K 6/445 | 701/22 |
| 2011/0066311 A1* | 3/2011 | Itagaki | B60W 20/40 | 701/22 |
| 2011/0125436 A1* | 5/2011 | Watanabe | G01R 31/3679 | 702/65 |
| 2011/0173469 A1* | 7/2011 | Minegishi | B60K 6/48 | 713/320 |
| 2011/0175574 A1* | 7/2011 | Sim | H01M 10/482 | 320/121 |
| 2011/0298417 A1* | 12/2011 | Stewart | G01R 31/025 | 320/107 |
| 2011/0307136 A1* | 12/2011 | Komata | B60K 6/365 | 701/22 |
| 2012/0016547 A1* | 1/2012 | Aridome | B60K 6/445 | 701/22 |
| 2012/0049771 A1* | 3/2012 | Komatsu | B60W 10/28 | 318/139 |
| 2012/0065827 A1* | 3/2012 | Kimura | B60L 11/1811 | 701/22 |
| 2012/0109442 A1* | 5/2012 | Kato | B60W 10/26 | 701/22 |
| 2012/0143425 A1* | 6/2012 | Yamamoto | B60W 10/24 | 701/22 |
| 2012/0161714 A1* | 6/2012 | Ishibashi | H02J 7/0063 | 320/135 |
| 2012/0176098 A1* | 7/2012 | Greening | G06F 1/189 | 320/136 |
| 2012/0223670 A1* | 9/2012 | Kinjo | H02J 3/32 | 320/103 |
| 2012/0293114 A1* | 11/2012 | Murochi | H01M 10/06 | 320/107 |
| 2013/0069596 A1* | 3/2013 | Ochiai | B60L 3/0046 | 320/118 |
| 2013/0200902 A1* | 8/2013 | Kurimoto | H01M 10/48 | 324/430 |
| 2013/0257379 A1* | 10/2013 | Kato | H02J 7/0029 | 320/128 |
| 2015/0039255 A1* | 2/2015 | Stewart | G01R 31/025 | 702/63 |

FOREIGN PATENT DOCUMENTS

| | | | | |
|---|---|---|---|---|
| JP | 4021325 B | * | 4/1992 | |
| JP | 2004056937 A | * | 2/2004 | |
| JP | 2006-034047 | | 2/2006 | |
| JP | 3882703 B2 | * | 2/2007 | |
| JP | 2008109840 A | * | 5/2008 | B60L 7/14 |
| JP | 2009261183 A | * | 11/2009 | B60K 6/365 |
| JP | 4469000 B2 | * | 5/2010 | B60K 6/365 |
| JP | 2010115048 A | * | 5/2010 | |
| JP | 2014017982 A | * | 1/2014 | |
| JP | 2014171335 A | * | 9/2014 | H01M 10/441 |
| KR | 20090073210 A | * | 7/2009 | B60L 7/14 |
| KR | 20110047010 A | * | 5/2011 | |
| WO | WO 2008041735 A1 | * | 4/2008 | B60L 7/14 |
| WO | WO 2013145658 A1 | * | 10/2013 | H01M 10/4207 |

* cited by examiner

CONTROL APPARATUS TO CONTROL DISCHARGE FROM BATTERY UNITS

BACKGROUND

The present disclosure relates to a control apparatus, a control method and a control system by which, for example, when discharge from a plurality of battery units is carried out, the discharge amount is controlled for each battery unit.

In recent years, in order to enhance the output capacity, a plurality of power supply modules are connected in parallel such that electric power is supplied from the power supply modules. For example, Japanese Patent Laid-open No. 2006-034047 discloses a power supply apparatus wherein a plurality of power supply units are connected in parallel and are successively started up.

SUMMARY

In the power supply apparatus disclosed in Japanese Patent Laid-Open No. 2006-034047 mentioned above, all power supply units are started up finally. Although it is preferable, when a plurality of power supply units connected in parallel operate, to control output voltages of the power supply units so as to be equal to each other with a high degree of accuracy, it is actually difficult to make the output voltages fully equal to each other. Therefore, only a battery of that one of the power supply units which outputs the highest output voltage discharges, and there is a problem that only a specific battery is exhausted. Also it is another problem that the discharge amount cannot be controlled for each power supply unit.

Therefore, it is desirable to provide a control apparatus, a control method and a control system by which, for example, when discharge from a plurality of battery units is carried out, the discharge amount is controlled for each battery unit.

According to an embodiment of the present disclosure, there is provided a control apparatus including a discrimination section configured to discriminate a plurality of battery units which are to share and output electric power required by a load, and a control section configured to carry out discharge control for the battery units in response to a situation of each of batteries which the battery units individually have.

According to another embodiment of the present disclosure, there is provided a control method including discriminating a plurality of battery units which are to share and output electric power required by a load, and carrying out discharge control for the battery units in response to a situation of each of batteries which the battery units individually have.

According to a further embodiment of the present disclosure, there is provided a control system including a plurality of battery units, and a control apparatus connected to the battery units, the control apparatus including a discrimination section configured to discriminate a plurality of battery units which are to share and output electric power required by a load from among the battery units, and a control section configured to carry out discharge control for the battery units in response to a situation of each of batteries which the battery units individually have.

At least with one of the embodiments, when discharge from a plurality of battery units is carried out, the discharge amount can be controlled for each battery unit.

DETAILED DESCRIPTION OF THE PREFERRED EMBODIMENT

In the following, an embodiment of the present disclosure is described with reference to the accompanying drawings. It is to be noted that the description is given in the following order.

<1. Embodiment>
<2. Modifications>

It is to be noted that the embodiment and the modifications described below are specific preferred examples of the present disclosure, and the present disclosure is not limited to the embodiment and the modifications.

1. Embodiment

[Configuration of the System]

Figure 1:
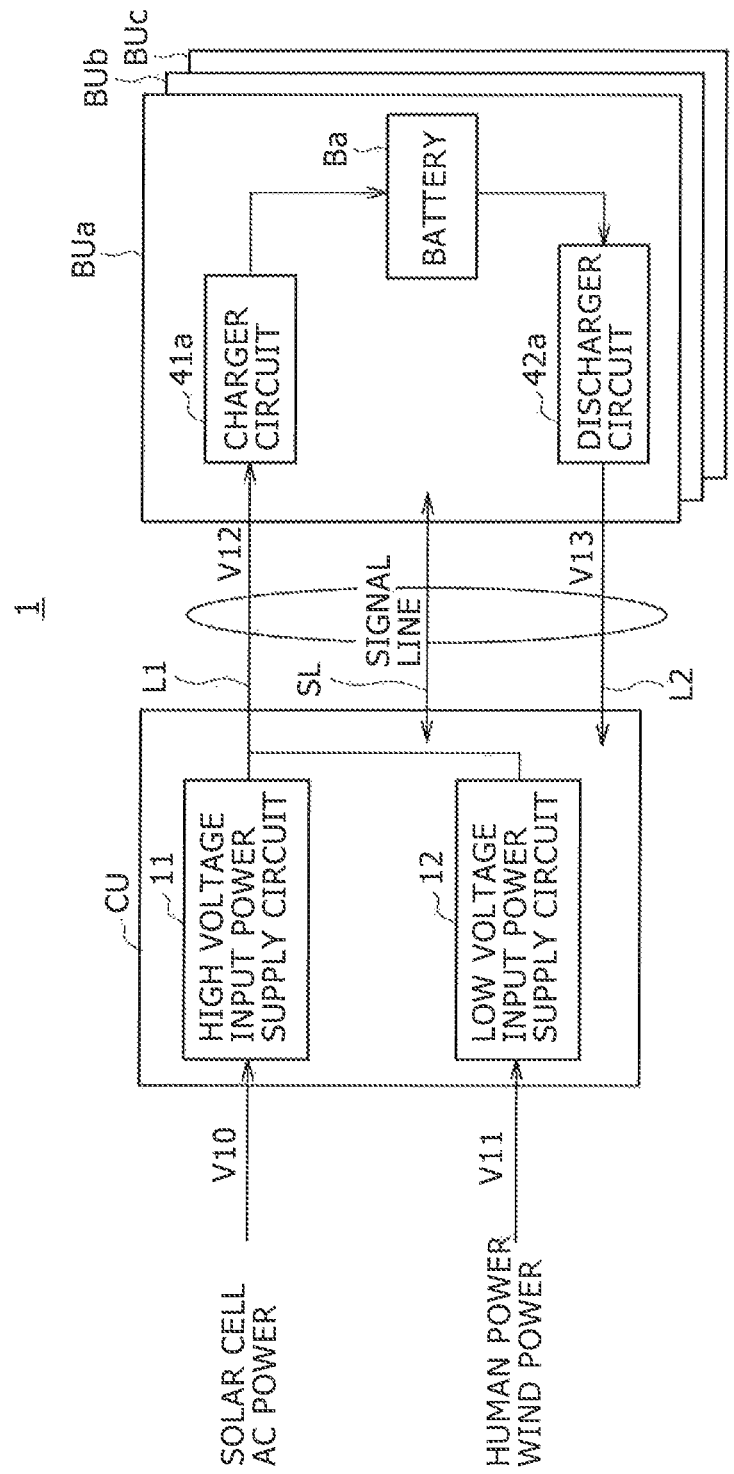
FIG. 1 is a block diagram showing an example of a configuration of a system.

FIG. 1 shows an example of a configuration of a control system according to the present disclosure. The control system is configured from one or a plurality of control units CU and one or a plurality of battery units BU. The control system 1 shown as an example in FIG. 1 includes one control unit CU, and three battery units BUa, BUb and BUc. When there is no necessity to distinguish the individual battery units, each battery unit is suitably referred to as battery unit BU.

In the control system 1, it is possible to control the battery units BU independently of each other. Further, the battery units BU can be connected independently of each other in the control system 1. For example, in a state in which the battery unit BUa and the battery unit BUb are connected in the control system 1, the battery unit BUc can be connected newly or additionally in the control system 1. Or, in a state in which the battery units BUa to BUc are connected in the control system 1, it is possible to remove only the battery unit BUb from the control system 1.

The control unit CU and the battery units BU are individually connected to each other by electric power lines. The power lines include, for example, an electric power line L1 by which electric power is supplied from the control unit CU to the battery units BU and another electric power line L2 by which electric power is supplied from the battery units BU to the control unit CU. Thus, bidirectional communication is carried out through a signal line SL between the control unit CU and the battery units BU. The communication may be carried out in conformity with such specifications as, for example, the SMBus (System Management Bus) or the UART (Universal Asynchronous Receiver-Transmitter).

The signal line SL is configured from one or a plurality of lines, and a line to be used is defined in accordance with an object thereof. The signal line SL is used commonly, and the battery units BU are connected to the signal line SL. Each battery unit BU analyzes the header part of a control signal transmitted thereto through the signal line SL to decide whether or not the control signal is destined for the battery unit BU itself. By suitably setting the level and so forth of the control signal, a command to the battery unit BU can be transmitted. A response from a battery unit BU to the control unit CU is transmitted also to the other battery units BU. However, the other battery units BU do not operate in response to the transmission of the response. It is so be noted that, while it is assumed that, in the press at example, transmission of electric power and communication are carried out by means of wires, they may otherwise be carried out by radio.

[General Configuration of the Control Unit]

The control unit CU is configured from a high voltage input power supply circuit 11 and a low voltage input power supply circuit 12. The control unit CU has one or a plurality of first devices. In the present example, the control unit CU has two first devices, which individually correspond to the high voltage input power supply circuit 11 and the low voltage input power supply circuit 12. It is to be noted that, although the terms "high voltage" and "low voltage" are used herein, the voltages to be inputted to the high voltage input power supply circuit 11 and the low voltage input power supply circuit 12 may be included in the same input range. The input ranges of the voltages which can be accepted by the high voltage input power supply circuit 11 and one low voltage input power supply circuit 12 may overlap with each other.

A voltage generated, by an electric power generation section which generates electricity in response to the environment is supplied to the high voltage input power supply circuit 11 and the low voltage input power supply circuit 12. For example, the electric power generation section is an apparatus which generates electricity by the sunlight or wind power. Meanwhile, the electric power generation section is not limited to that apparatus which generates electricity in response the natural environment. For example, the electric power generation section may be configured as an apparatus which generates electricity by human power. Although an electric generator whose power generation energy fluctuates in response to the environment or the situation is assumed in this manner, also that electric generator whose power generation energy does not fluctuate is applicable. Therefore, as seen in FIG. 1, also AC power can be inputted to the control system 1. It is to be noted that voltages are supplied from the same electric power generation section or different electric power generation sections to the high voltage input power supply circuit 11 and the low voltage input power supply circuit 12. The voltage or voltages generated by the electric power generation section or sections are an example of a first voltage or voltages.

To the high voltage input power supply circuit 11, for example, a DC (Direct Current) voltage V10 of approximately 75 to 100 V (volts) generated by photovoltaic power generation is supplied. Alternatively, an AC (Alternating Current) voltage of approximately 100 to 250 V may be supplied to the high voltage input power supply circuit 11. The high voltage input power supply circuit 11 generates a second voltage in response to a fluctuation of the voltage V10 supplied thereto by photovoltaic power generation. For example, the voltage V10 is stepped down by the high voltage input power supply circuit 11 to generate the second voltage. The second voltage is a DC voltage, for example, within a range of 45 to 48 V.

When the voltage V10 is 75 V, the high voltage input power supply circuit 11 converts the voltage V10 into 45 V. However, when the voltage V10 is 100 V, the high voltage input power supply circuit 11 converts the voltage V10 into 48 V. In response to a variation of the voltage V10 within the range from 75 to 100 V, the high voltage input power supply circuit 11 generates the second voltage such that the second voltage changes substantially linearly within the range from 45 to 48 V. The high voltage input power supply circuit 11 outputs the generated second voltage. It is to be noted that the rate of change of the second voltage need nor necessarily be linear, but a feedback circuit may be used such that the output of the high voltage input power supply circuit 11 is used as it is.

To the low voltage input power supply circuit 12, a DC voltage V11 within a range of 10 to 40 V generated, for example, by electric power generation by wind or electric power generation by human power is supplied. The low voltage input power supply circuit 12 generates a second voltage in response to a fluctuation of the voltage V11 similarly to the high voltage input power supply circuit 11. The low voltage input power supply circuit 12 steps up the voltage V11, for example, to a DC voltage within the range of 45 to 48 V in response to a change of the voltage V11 within the range from 10 V to 40 V. The stepped up DC voltage is outputted from the low voltage input power supply circuit 12.

Both or one of the output voltages of the high voltage input power supply circuit 11 and the low voltage input power supply circuit 12 is inputted to the battery units BU. In FIG. 1, the DC voltage supplied to the battery units BU is denoted by V12. As described hereinabove, the voltage V12 is, for example, a DC voltage within the range from 45 to 48 V. All or some of the battery units BU are charged by the voltage V12. It is to be noted that a battery unit BU which is discharging is not charged.

A personal computer may be connectable to the control unit CU. For example, a USB (Universal Serial Bus) cable is used to connect the control unit CU and the personal computer to each other. The control unit CU may be controlled using the personal computer.

[General Configuration of the Battery Unit]

A general configuration of a battery unit which is an example of a second apparatus is described. While description is given below taking the battery unit BUa as an example, unless otherwise specified, the battery unit BUb and the battery unit BUc have the same configuration.

The battery unit BUa includes a charger or charging circuit 41a, a discharger or discharging circuit 42a and a battery Ba. Also the other battery units BU include a charger or charging circuit, a discharger or discharging circuit and a battery. In the following description, when there is no necessity to distinguish each battery, it is referred to suitably as battery B.

The charger circuit 41a converts the voltage V12 supplied thereto from the control unit CU into a voltage applicable to the battery Ba. The battery Ba is charged based on the voltage obtained by the conversion. It is to be noted that the charger circuit 41a changes the charge rate into the battery Ba in response to a fluctuation of the voltage V12.

Electric power outputted from the battery Ba is supplied to the discharger circuit 42a. From the battery Ba, for example, a DC voltage within a range from substantially from 12 to 55 V is outputted. The DC voltage supplied from the battery Ba is converted into a DC voltage V13 by the discharger circuit 42a. The voltage V13 is a DC voltage of, for example, 48 V. The voltage V13 is outputted from the discharger circuit 42a to the control unit CU through the electric power line L2. It is to be noted that the DC voltage outputted from the battery Ba may otherwise be supplied directly to an external apparatus without by way of the discharger circuit 42a.

Each battery B may be a lithium-ion battery, an olivine-type iron phosphate lithium-ion battery, a lead battery or the like. The batteries B of the battery units BU may be those of different battery types from each other. For example, the battery Ba of the battery unit BUa and the battery Bb of the battery unit BUb are configured from a lithium-ion battery and the battery Bc of the battery unit BUc is configured from a lead, battery. The number and the connection scheme of battery cells in the batteries B can be changed suitably. A plurality of battery cells may be connected in series or in parallel. Or series connections of a plurality of battery cells may be connected in parallel.

When the battery units discharge, in the case where the load is light, the highest one of the output voltages of the battery units is supplied as the voltage V13 to the electric power line L2. As the load becomes heavier, the outputs of the battery units are combined, and the combined output is supplied to the electric power line L2. The voltage V13 is supplied to the control unit CU through the electric power line L2. The voltage V13 is outputted from an output port of the control unit CU. To the control unit CU, electric power can be supplied in a distributed relationship from the battery units BU. Therefore, the burden on the individual battery units BU can be moderated.

For example, the following use form may be available. The voltage V13 outputted from, the battery unit BUa is supplied, to an external apparatus through the control unit CU. To the battery unit BUb, the voltage V12 is supplied from the control unit CU, and the battery Bb of the battery unit BUb is charged. The battery unit BUc is used as a redundant power supply. For example, when the remaining capacity of the battery unit BUa drops, the battery unit to be used is changed over from the battery unit BUa to the battery unit. BUc and the voltage V13 outputted from the battery unit BUc is supplied to the external apparatus. Naturally, the use form described is an example, and the use form of the control system 1 is not limited to this specific use form.

[Internal Configuration of the Control Unit]

Figure 2:
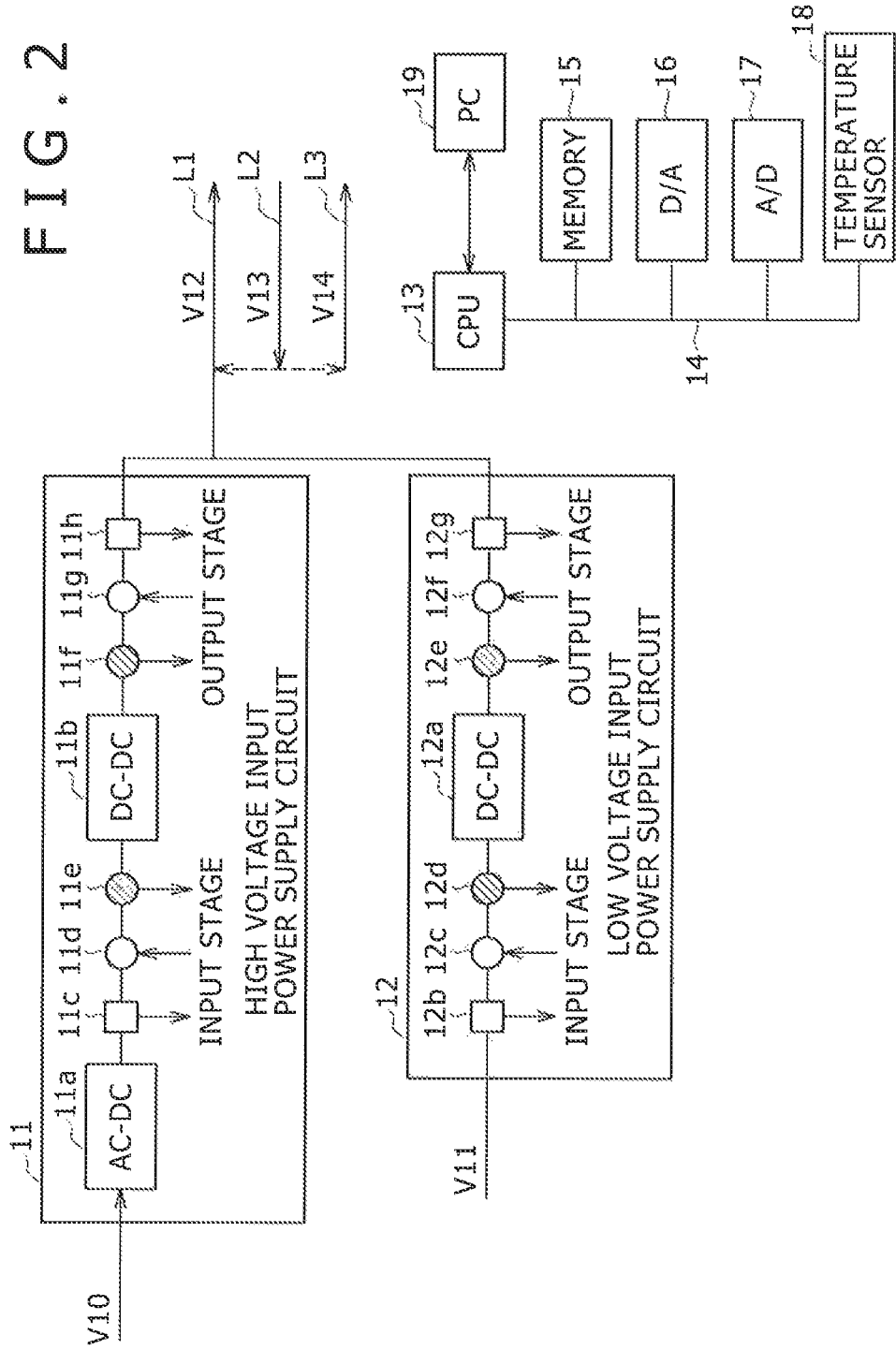
FIG. 2 is a block diagram showing an example of a configuration of a control unit.

FIG. 2 shows an example of an internal configuration of the control unit CU. As described hereinabove, the control unit CU includes the high voltage input power supply circuit 11 and the low voltage input power supply circuit 12. Referring to FIG. 2, the high voltage input power supply circuit 11 includes an AC-DC converter 11a for converting an AC input to a DC output, and a DC-DC converter 11b for stepping down the voltage V10 to a DC voltage within the range from 45 to 48 V. The AC-DC converter 11a and the DC-DC converter 11b may be those of known types. It is to be noted that, in the case where only a DC voltage is supplied to the high voltage input power supply circuit 11, the AC-DC converter 11a may be omitted.

A voltage sensor, an electronic switch and a current sensor are connected to each of an input stage and an output stage of the DC-DC converter 11b. In FIG. 2 and also in FIG. 5 hereinafter described, the voltage sensor is represented by a square mark; the electronic switch by a round mark; and the current sensor by a round, mark with slanting lines individually in a simplified representation. In particular, a voltage sensor 11c, an electronic switch 11d and a current sensor 11e are connected to the input stage of the DC-DC converter 11b. A current sensor 11f, an electronic switch 11g and a voltage sensor 11h are connected to the output stage of the DC-DC converter 11b. Sensor information obtained by the sensors is supplied to a CPU (Central Processing Unit) 13 hereinafter described. On/off operations of the electronic switches are controlled by the CPU 13.

The low voltage input power supply circuit 12 includes a DC-DC converter 12a for stepping up the voltage V11 to a DC voltage within, the range from 45 to 48 V. A voltage sensor, an electronic switch and a current sensor are connected to each of an input stage and an output stage of the low voltage input power supply circuit 12. In particular, a voltage sensor 12b, an electronic switch 12c and a current sensor 12d are connected to the input stage of the DC-DC converter 12a. A current sensor 12e, an electronic switch 12f and a voltage sensor 12g are connected to the output stage of the DC-DC converter 12a. Sensor information obtained by the sensors is supplied to the CPU 13. On/off operations of the switches are controlled by the CPU 13.

It is to be noted that, in FIG. 2, an arrow mark extending from a sensor represents that sensor information is supplied to the CPU 13. An arrow mark extending to an electronic switch represents that the electronic switch is controlled by the CPU 13.

An output voltage of the high voltage input power supply circuit 11 is outputted through a diode. An output voltage of the low voltage input power supply circuit 12 is outputted through another diode. The output voltage of the high voltage input power supply circuit 11 and the output voltage of the low voltage input power supply circuit 12 are combined, and the combined voltage V12 is outputted to the battery unit BU through the electric power line L1. The voltage V13 supplied from the battery unit BU is supplied to the control unit CU through the electric power line L2. Then, the voltage V13 supplied to the control unit CU is supplied to the external apparatus through an electric power line L3. It is to be noted that, in FIG. 2, the voltage supplied to the external apparatus is represented as voltage V14.

The electric power line L3 may be connected to the battery units BU. By this configuration, for example, a voltage outputted from the battery unit BUa is supplied to the control unit CU through the electric power line L2. The supplied voltage is supplied to the battery unit BUb through the electric power line L3 and can charge the battery unit BUb. It is to be noted that, though not shown, power supplied to the control unit CU through the electric power line L2 may be supplied to the electric power line L1.

The control unit CU includes the CPU 13. The CPU 13 controls the components of the control unit CU. For example the CPU 13 switches on/off the electronic switches of the high voltage input power supply circuit 11 and the low voltage input power supply circuit 12. Further, the CPU 13 supplies control signals to the battery units BU. The CPU 13 supplies to the battery units BU a control signal for turning on the power supply to the battery units BU or a control signal for instructing the battery units BU to charge or discharge. The CPU 13 can output control signals of different contents to the individual battery units BU.

The CPU 13 is connected to a memory 15, a D/A (Digital to Analog) conversion section 16, an A/D (Analog to Digital) conversion section 17 and a temperature sensor 18 through a bus 14. The bus 14 is configured, for example, from an I$^2$C bus. The memory 15 is configured from a nonvolatile memory such as an EEPROM (Electrically Erasable and Programmable Read Only Memory). The D/A conversion section 16 converts digital signals used in various processes into analog signals.

The CPU 13 receives sensor information measured by the voltage sensors and the current sensors. The sensor information is inputted to the CPU 13 after it is converted into digital signals by the A/D conversion section 17. The temperature sensor 18 measures an environmental temperature. For example, the temperature sensor 18 measures a temperature in the inside of the control unit CU or a temperature around the control unit CU.

The CPU 13 may have a communication function. For example, the CPU 13 and a personal computer (PC) 19 may communicate with each other. The CPU 13 may communicate not only with the personal computer but also with an apparatus connected to a network such as the Internet.

[Power Supply System of the Control Unit]

Figure 3:
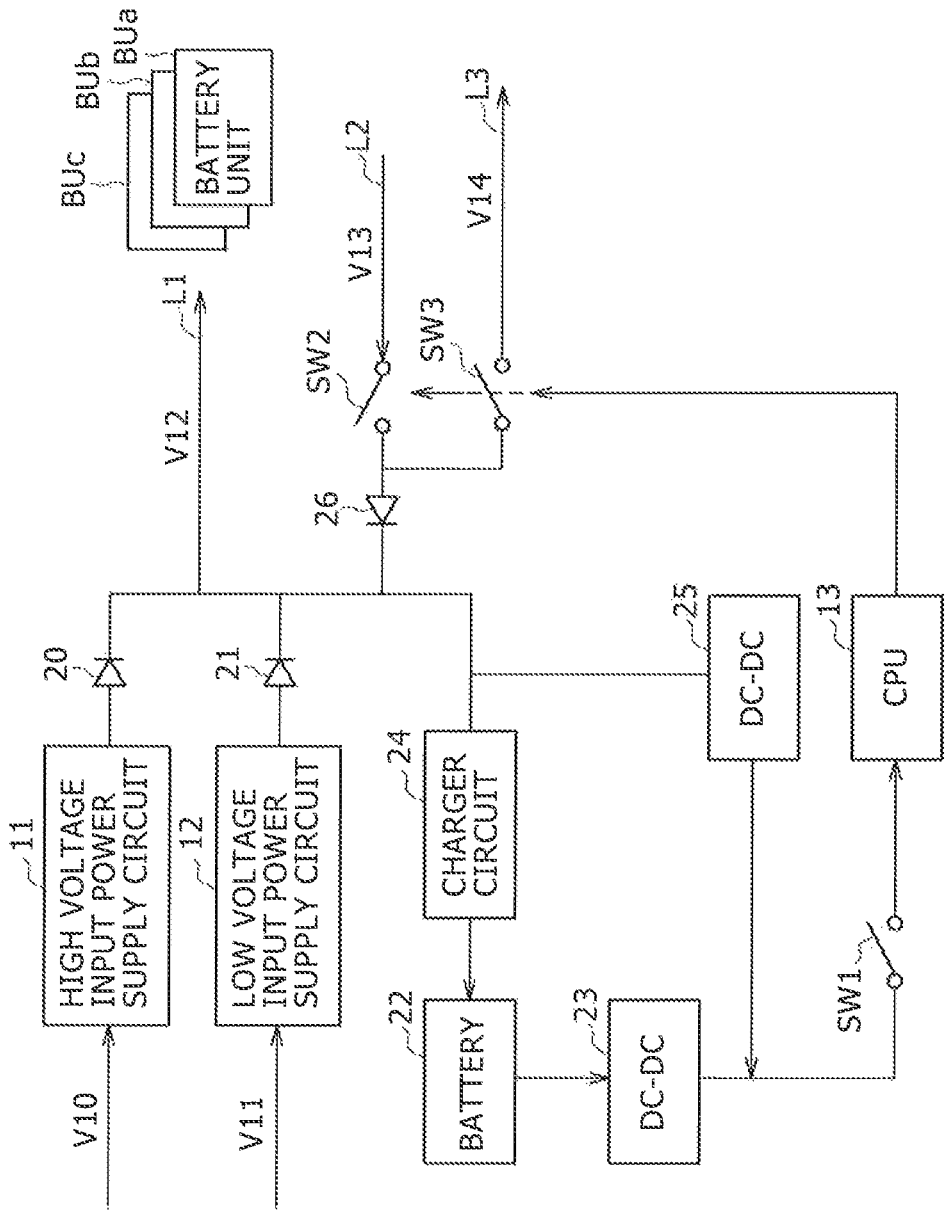
FIG. 3 is a block diagram showing an example of a configuration of a power supply system of the control unit.

FIG. 3 principally shows an example of a configuration of the control unit CU which relates to a power supply system. A diode 20 for the backflow prevention is connected to the output stage of the high voltage input power supply circuit 11. Another diode 21 for the backflow prevention is connected to the output stage of the low voltage input power supply circuit 12. The high voltage input power supply circuit 11 and the low voltage input power supply circuit 12 are connected to each other by OR connection by the diode 20 and the diode 21. Outputs of the high voltage input power supply circuit 11 and the low voltage input power supply circuit 12 are combined and supplied to the battery unit BU. Actually, that one of the outputs of the high voltage input power supply circuit 11 and the low voltage input power supply circuit 12 which exhibits a higher voltage is supplied to the battery unit BU. However, also a situation in which the electric power from both of the high voltage input power supply circuit 11 and the low voltage input power supply circuit 12 is supplied is entered in response to the power consumption of the battery unit BU which serves as a load.

The control unit CU includes a main switch SW1 which can be operated by a user. When the main switch SW1 is switched on, electric power is supplied to the CPU 13 to start up the control unit CU. The electric power is supplied to the CPU 13, for example, from a battery 22 built in the control unit CU. The battery 22 is a rechargeable battery such as a lithium-ion battery. A DC voltage from the battery 22 is converted into a voltage, with which the CPU 13 operates, by a DC-DC converter 23. The voltage obtained by the conversion is supplied as a power supply voltage to the CPU 13. In this manner, upon start-up of the control unit CU, the battery 22 is used. The battery 22 is controlled, for example, by the CPU 13.

The battery 22 can be charged by electric power supplied from the high voltage input power supply circuit 11 or the low voltage input power supply circuit 12 or otherwise from the battery units BU. Electric power supplied from the battery units BU is supplied to a charger circuit 24. The charger circuit 24 includes a DC-DC converter. The voltage V13 supplied from the battery units BU is converted into a DC voltage of a predetermined level by the charger circuit 24. The DC voltage obtained by the conversion is supplied to the battery 22. The battery 22 is charged by the DC voltage supplied thereto.

It is to be noted that the CPU 13 may operate with the voltage V13 supplied thereto from the high voltage input power supply circuit 11, low voltage input power supply circuit 12 or battery units BU. The voltage V13 supplied from the battery units BU is converted into a voltage of a predetermined level by a DC-DC converter 25. The voltage obtained by the conversion is supplied as a power supply voltage to the CPU 13 so that the CPU 13 operates.

After the control unit CU is started up, if at least one of the voltages V10 and V11 is inputted, then the voltage V12 is generated. The voltage V12 is supplied to the battery units BU through the electric power line L1. At this time, the CPU 13 uses the signal line SL to communicate with the battery units BU. By this communication, the CPU 13 outputs a control signal for instructing the battery units BU to start up and discharge. Then, the CPU 13 switches on a switch SW2. The switch SW2 is configured, for example, from an PET (Field Effect Transistor). Or the switch SW2 may be configured from an IGBT (Insulated Gate Bipolar Transistor). When the switch SW2 is on, the voltage V13 is supplied from the battery units BU to the control unit CU.

A diode 26 for the backflow prevention is connected to the output side of the switch SW2. The connection of the diode 26 can prevent unstable electric power, which is supplied from a solar battery or a wind power generation source, from being supplied directly to the external apparatus. Thus, stabilised electric power supplied from the battery units BU can be supplied to the external apparatus. Naturally, a diode may be provided on the final stage of the battery units BU in order to secure the safety.

In order to supply the electric power supplied from the battery units BU to the external apparatus, the CPU 13 switches on a switch SW3. When the switch SW3 is switched on, the voltage V14 based on the voltage V13 is supplied to the external apparatus through the electric power line L3. It is to be noted that the voltage V14 may be supplied to the other battery units BU so that the batteries B of the other battery units BU are charged by the voltage V14.

The CPU 13 has a function of acquiring the voltage of the voltage V13 or the voltage V14. For example, a detection resistor is connected to the electric power line L2 or the electric power line L3 and the voltage across the detection resistor is measured so that the CPU 13 acquires a voltage value of the voltage V13 or the voltage V14. The CPU 13 monitors the voltage variation when a predetermined battery unit and a predetermined load are connected to the control unit CU.

[Example of the Configuration of the High Voltage Input Power Supply Circuit]

Figure 4:
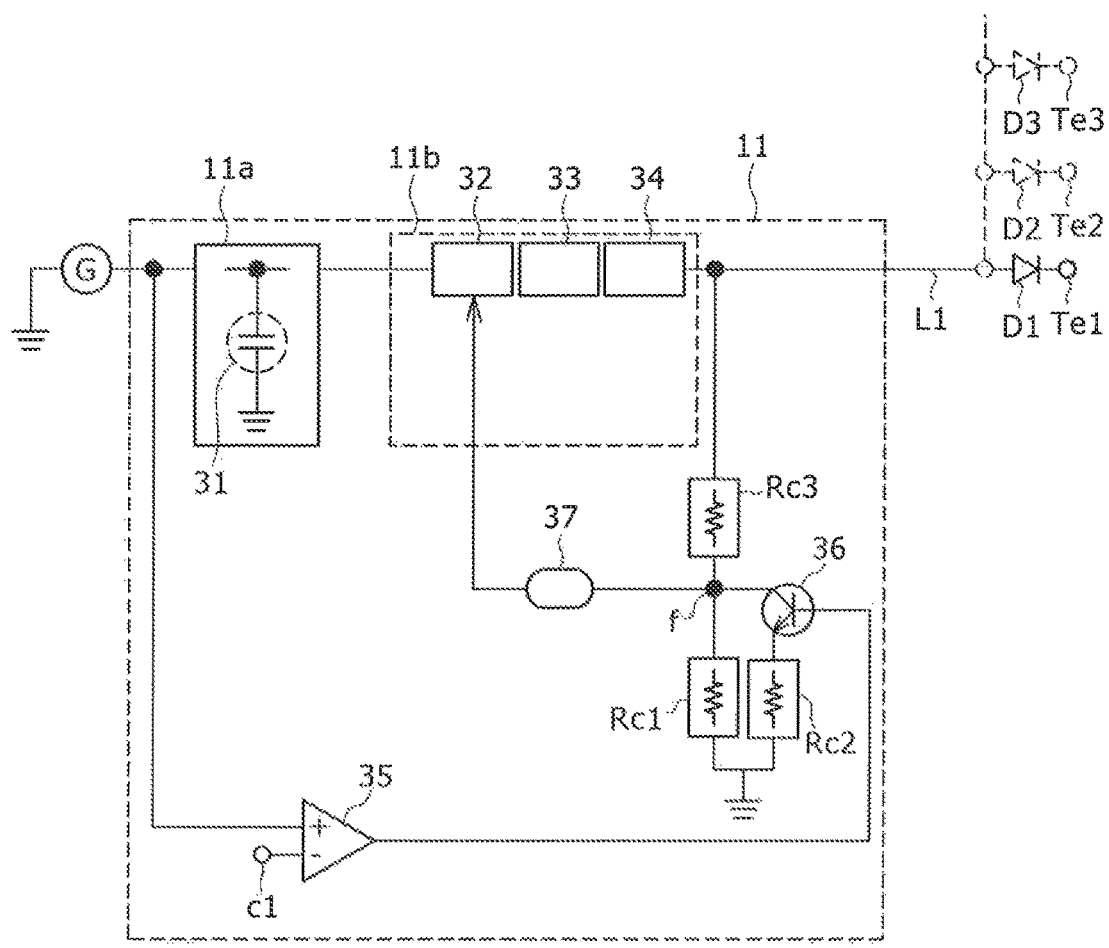
FIG. 4 is a circuit diagram showing an example of a particular configuration of a high voltage input power supply circuit of the control unit.
Figure 14:
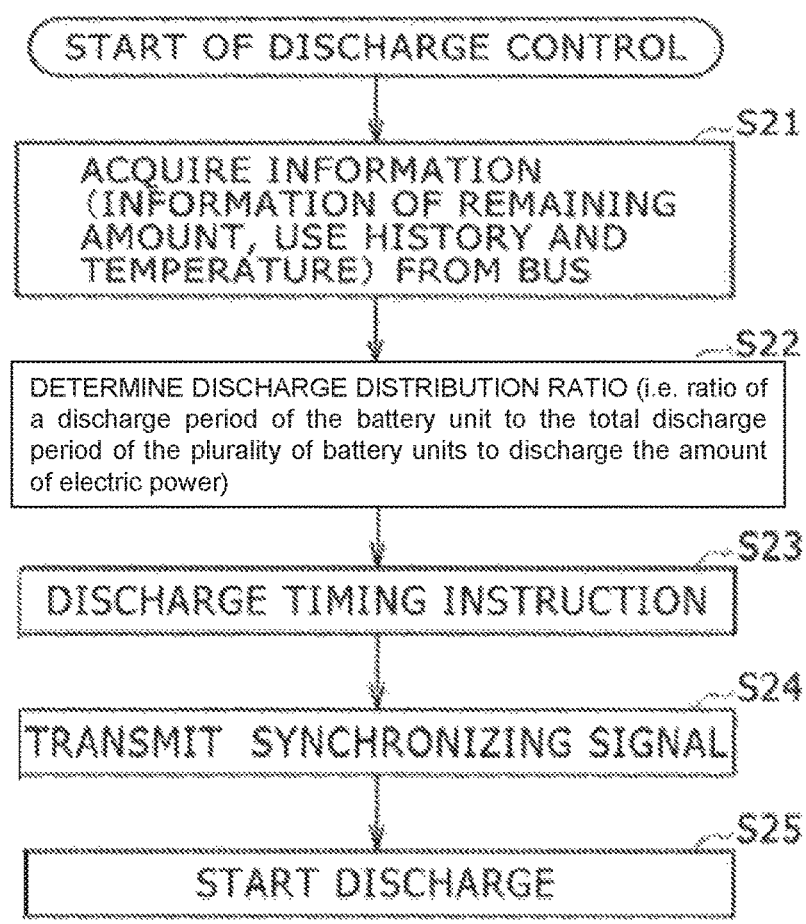
FIG. 14 is a flow chart illustrating an example of a process of determining a charge amount of a battery unit.

FIG. 4 shows an example of a particular configuration of the high voltage input power supply circuit. Referring to FIG. 14, the high voltage input power supply circuit 11 includes the DC-DC converter 11b and a feedforward controlling system hereinafter described. In FIG. 4, the voltage sensor 11c, electronic switch 11d, current sensor 11e, current sensor 11f, electronic switch 11g and voltage sensor 11h as well as the diode 20 and so forth are not shown.

The low voltage input power supply circuit 12 is configured substantially similarly to the high voltage input power supply circuit 11 except that the DC-DC converter 12a is that of the step-up type.

The DC-DC converter 11b is configured from a primary side circuit 32 including, for example, a switching element, a transformer 33, and a secondary side circuit 34 including a rectification element and so forth. The DC-DC converter 11b shown in FIG. 4 is that of the current resonance type, namely, an LLC resonance converter.

The feedforward controlling system includes an operational amplifier 35, a transistor 36 and resistors Rc1, Rc2 and Rc3. An output of the feedforward controlling system is inputted to a controlling terminal provided on a driver of the primary side circuit 32 of the DC-DC converter 11b. The DC-DC converter 11b adjusts the output voltage from the high voltage input power supply circuit 11 so that the input voltage to the controlling terminal may be fixed.

Since the high voltage input power supply circuit 11 includes the feedforward controlling system, the output voltage from the high voltage input power supply circuit 11 is adjusted so that the value thereof may become a voltage value within a range set in advance. Accordingly, the control unit CU including the high voltage input power supply circuit 11 has a function of a voltage conversion apparatus which varies the output voltage, for example, in response to a change of the input voltage from a solar cell or the like.

As seen in FIG. 4, an output voltage is extracted from the high voltage input power supply circuit 11 through the AC-DC converter 11a including a capacitor 31, primary side circuit 32, transformer 33 and secondary side circuit 34. The AC-DC converter 11a is a power factor correction circuit disposed where the input to the control unit CU from the outside is an AC power supply.

The output from the control unit CU is sent to the battery units BU through the electric power line L1. For example, the individual battery units BUa, BUb and BUc are connected to output terminals Te1, Te2, Te3, . . . through diodes D1, D2, D3, . . . for the backflow prevention, respectively.

In the following, the feedforward controlling system provided in the high voltage input power supply circuit 11 is described.

A voltage obtained by stepping down the input voltage to the high voltage input power supply circuit 11 to kc times, where kc is approximately one several tenth or one hundredth, is inputted to the non-negated input terminal of the operational amplifier 35. Meanwhile, to the negated input terminal c1 of the operational amplifier 35, a voltage obtained by stepping down a fixed voltage $Vt_0$ determined in advance to kc times is inputted. The input voltage $kc \times Vt_0$ to the negated input terminal c1 of the operational amplifier 35 is applied, for example, from the D/A conversion section 16. The value of the voltage $Vt_0$ is retained in a built-in memory of the D/A conversion section 16 and can be changed as occasion demands. The value of the voltage $Vt_0$ may otherwise be retained into the memory 15 connected to the CPU 13 through the bus 14 such that if is transferred to the D/A conversion section 16.

The output terminal of the operational amplifier 35 is connected to the base of the transistor 36, and voltage-current conversion is carried out in response to the difference between the input voltage to the non-negated input terminal and the input voltage to the negated input terminal of the operational amplifier 35 by the transistor 36.

The resistance value of the resistor Rc2 connected to the emitter of the transistor 36 is higher than the resistance value of the resistor Rc1 connected in parallel to the resistor Rc2.

It is assumed that, for example, the input voltage to the high voltage input power supply circuit 11 is sufficiently higher than the fixed voltage $Vt_0$ determined in advance. At this time, since the transistor 36 is in an on state, and the value of the combined resistance of the resistor Rc1 and the resistor Rc2 is lower than the resistance value of the resistor Rc1, the potential at a point f shown in FIG. 4 approaches the ground potential.

Consequently, the input voltage to the controlling terminal provided on the driver of the primary side circuit 32 and connected to the point f through a photo-coupler 37 drops. The DC-DC converter 11b which detects the drop of the input voltage to the controlling terminal steps up the output voltage from the high voltage input power supply circuit 11 so that the input voltage to the controlling terminal may be fixed.

It is assumed now that, for example, the terminal voltage of the solar cell connected to the control unit CU drops conversely and the input voltage to the high voltage input power supply circuit 11 approaches the fixed voltage $Vt_0$ determined advance.

As the input voltage to the high voltage input power supply circuit 11 drops, the state of the transistor 36 approaches an off state from an on state. As the state of the transistor 36 approaches an off state from an on state, current becomes less likely to flow to the resistor Rc1 and the resistor Rc2, and the potential at the point f shown in FIG. 4 rises.

Consequently, the input voltage to the controlling terminal provided on the driver of the primary side circuit 32 is brought out of a state in which it is kept fixed. Therefore, the DC-DC converter 11b steps down the output voltage from the high voltage input power supply circuit 11 so that the input voltage to the controlling terminal may be fixed.

In other words, in the case where the input voltage is sufficiently higher than the fixed voltage $Vt_0$ determined advance, the high voltage input power supply circuit 11 steps up the output voltage. On the other hand, if the terminal voltage of the solar cell drops and the input voltage approaches the fixed voltage $Vt_0$ determined in advance, then the high voltage input power supply circuit 11 steps down the output voltage. In this manner, the control unit CU including the high voltage input power supply circuit 11 dynamically changes the output voltage in response to the magnitude of the input voltage.

Furthermore, as hereinafter described, the high voltage input power supply circuit 11 dynamically changes the output voltage also in response to a change of the voltage required on the output side of the control unit CU.

For example, it is assumed that the number of those battery units BU which are electrically connected to the control unit CU increases during electric generation of the solar cell. In other words, it is assumed that the load as viewed from the solar cell increases during electric generation of the solar cell.

In this instance, a battery unit BU is electrically connected additionally to the control unit CU, and consequently, the terminal voltage of the solar cell connected to the control unit CU drops. Then, when the input voltage to the high voltage input power supply circuit 11 drops, the state of the transistor 36 approaches an off state from an on state, and the output voltage from the high voltage input power supply circuit 11 is stepped down.

On the other hand, if it is assumed that the number of those battery units BU which are electrically connected to the control unit CU decreases during electric generation of the solar cell, then the load as viewed from the solar cell decreases. Consequently, the terminal voltage of the solar cell connected to the control unit CU rises. If the input voltage to the high voltage input power supply circuit 11 becomes sufficiently higher than the fixed voltage $Vt_0$ determined in advance, then the input voltage to the controlling terminal provided on the driver of the primary side circuit 32 drops. Consequently, the output voltage from the high voltage input power supply circuit 11 is stepped up.

It is to be noted that the resistance values of the resistors Rc1, Rc2 and Rc3 are selected suitably such that the value of the output voltage of the high voltage input power supply circuit 11 may be included in a range set in advance. In other words, the upper limit to the output voltage from the high voltage input power supply circuit 11 is determined by the resistance values of the resistors Rc1 and Rc2. The transistor 36 is disposed so that, when the input voltage to the high voltage input power supply circuit 11 is higher than the predetermined value, the value of the output voltage from the high voltage input power supply circuit 11 may not exceed the voltage value of the upper limit set in advance.

On the other hand, the lower limit to the output voltage from the high voltage input power supply circuit 11 is determined by the input voltage to the non-negated input terminal of an operational amplifier of a feedforward controlling system of the charger circuit 41*a* as hereinafter described.

[Internal Configuration of the Battery Unit]

Figure 5:
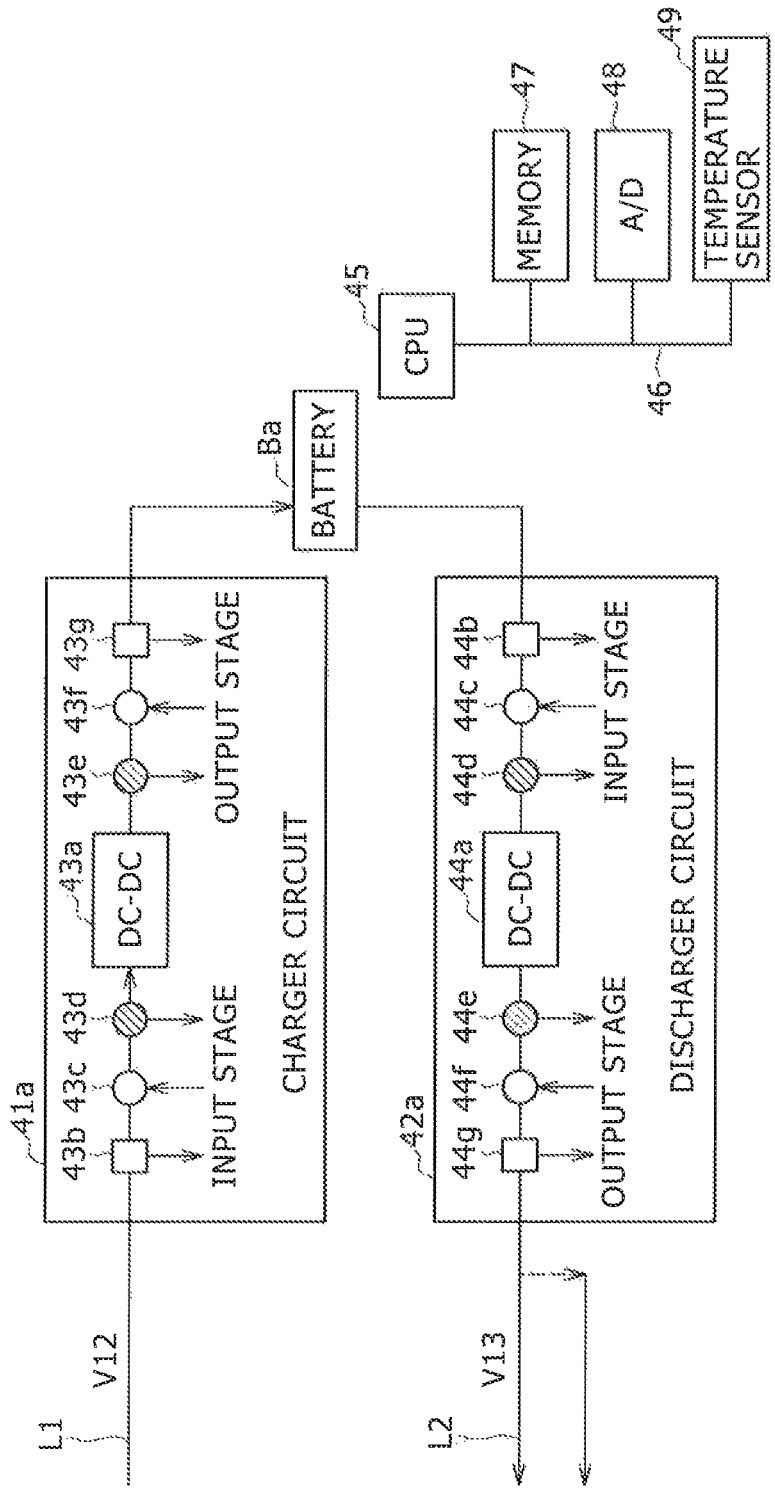
FIG. 5 is a block diagram showing an example of a configuration of a battery unit.

FIG. 5 shows an example of an internal configuration of the battery units BU. Here, description is given taking the battery unit BUa as an example. Unless otherwise specified, the battery unit BUb and the battery unit BUc have a configuration similar to that of the battery unit BUa.

Referring to FIG. 5, the battery unit BUa includes a charger circuit 41*a*, a discharger circuit 42*a* and a battery Ba. The voltage V12 is supplied from the control unit CU to the charger circuit 41*a*. The voltage V13 which is an output from the battery unit BUa is supplied to the control unit CU through the discharger circuit 42*a*. The voltage V13 may otherwise be supplied directly to the external apparatus from the discharger circuit 42*a*.

The charger circuit 41*a* includes a DC-DC converter 43*a*. The voltage V12 inputted to the charger circuit 41*a* is converted into a predetermined voltage by the DC-DC converter 43*a*. The predetermined voltage obtained by the conversion is supplied to the battery Ba to charge the battery Ba. The predetermined voltage differs depending upon the type and so forth of the battery Ba. To the input stage of the DC-DC converter 43*a*, a voltage sensor 43*b*, an electronic switch 43*c* and a current sensor 43*d* are connected. To the output stage of the DC-DC converter 43*a*, a current sensor 43*e*, an electronic switch 43*f* and a voltage sensor 43*g* are connected.

The discharger circuit 42*a* includes a DC-DC converter 44*a*. The DC voltage supplied from the battery Ba to the discharger circuit 42*a* is converted into the voltage V13 by the DC-DC converter 44*a*. The voltage V13 obtained by the conversion is outputted from the discharger circuit 42*a*. To the input stage of the DC-DC converter 44*a*, a voltage sensor 44*b*, an electronic switch 44*c* and a current sensor 44*d* are connected. To the output stage of the DC-DC converter 44*a*, a current sensor 44*e*, an electronic switch 44*f* and a voltage sensor 44*g* are connected.

The battery unit BUa includes a CPU 45. The CPU 45 controls the components of the battery unit BU. For example, the CPU 45 controls on/off operations of the electronic switches. The CPU 45 may carry out processes for assuring the safety of the battery B such as an overcharge preventing function and an excessive current preventing function. The CPU 45 is connected to a bus 46. The bus 46 may be, for example, an $I^2C$ bus.

To the bus 46, a memory 47, an A/D conversion section 48 and a temperature sensor 49 are connected. The memory 47 is a rewritable nonvolatile memory such as, for example, an EEPROM. The A/D conversion section 48 converts analog sensor information obtained by the voltage sensors and the current sensors into digital information. The sensor information converted into digital signals by the A/D conversion section 48 is supplied to the CPU 45. The temperature sensor 49 measures the temperature at a predetermined place in the battery unit BU. Particularly, the temperature sensor 49 measures, for example, the temperature of the periphery of a circuit board on which the CPU 45 is mounted, the temperature of the charger circuit 41*a* and the discharger circuit 42*a* and the temperature of the battery Ba.

[Power Supply System of the Battery Unit]

Figure 6:
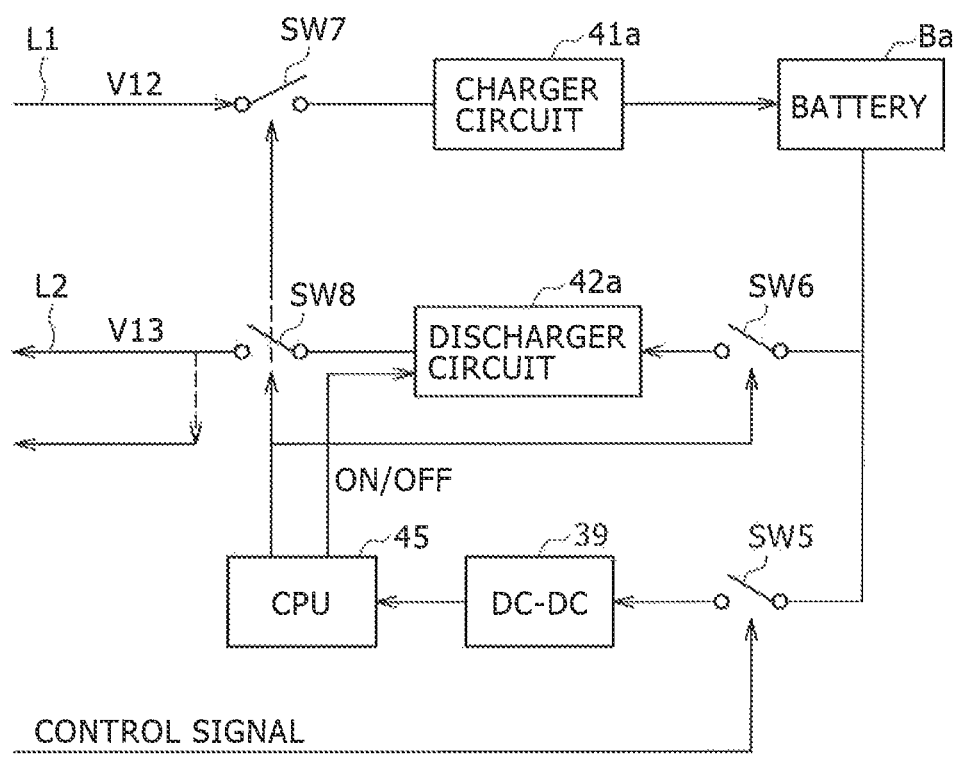
FIG. 6 is a block diagram showing an example of a configuration of a power supply system of the battery unit.

FIG. 6 snows an example of a configuration of the battery unit BUa principally relating to a power supply system. Referring to FIG. 6, the battery unit BUa does not include a main switch. A switch SW5 and a DC-DC converter 39 are connected between the battery Ba and the CPU 45. Another switch SW6 is connected between the battery Ba and the discharger circuit 42*a*. A further switch SW7 is connected to the input stage of the charger circuit 41*a*. A still further switch SW8 is connected to the output stage of the discharger circuit 42*a*. The switches SW are configured, for example, from an FET.

The battery unit BUa is started up, for example, by a control signal from the control unit CU. A control signal, for example, of the high level is normally supplied from the control unit CU to the battery unit BUa through a predetermined signal line. Therefore, only by connecting a port of the battery unit BUa to the predetermined signal line, the control signal, of the high level is supplied to the switch SW5 making the switch SW5 in an on state to start up the battery unit BUa. When the switch SW5 is on, a DC voltage from the battery Ba is supplied to the DC-DC converter 39. A power supply voltage for operating the CPU 45 is generated by the DC-DC converter 39. The generated power supply voltage is supplied, to the CPU 45 to operate the CPU 45.

The CPU 45 executes control in accordance with an instruction of the control unit CU. For example, a control signal for the instruction to charge is supplied from the control unit CU to the CPU 45. In response to the instruction to charge, the CPU 45 switches off the switch SW6 and the switch SW8 and then switches on the switch SW7. When the switch SW7 is on, the voltage V12 supplied from the control unit CU is supplied to the charger circuit 41*a*. The voltage V12 is converted into a predetermined voltage by the charger circuit 41*a*, and the battery Ba is charged by the predetermined voltage obtained by the conversion. It is to be noted that the charging method into the battery B can be changed suitably in response to the type of the battery B.

For example, a control, signal for the instruction to discharge is supplied from the control unit CU to the CPU 45. In response to the instruction to discharge, the CPU 45 switches off the switch SW7 and switches on the switches SW6 and SW8. For example, the switch SW8 is switched on after a fixed interval of time after the switch SW6 is switched on. When the switch SW6 is on, the DC voltage from the battery Ba is supplied, to the discharger circuit 42a. The DC voltage from the battery Ba is converted into the voltage V13 by the discharger circuit 42a. The voltage V13 obtained by the conversion is supplied to the control unit CU through the switch SW8. It is to be noted that, though not shown, a diode may be added to a succeeding stage to the switch SW8 in order to prevent the output of the switch SW8 from interfering with the output from a different one of the battery units BU.

It is to be noted that, if an instruction of a timing for charge or discharge is issued from the control unit CU to each battery unit BU in advance, then the CPU 45 of the battery unit BU can carry out a charge or discharge operation in accordance with the designated timing.

It is to be noted that the discharger circuit 42a can be changed over between on and off by control of the CPU 45. In this instance, an ON/OFF signal line extending from the CPU 45 to the discharger circuit 42a is used. For example, a switch SW not shown is provided on the output side of the switch SW6. The switch SW in this instance is hereinafter referred to as switch SW10 taking the convenience in description into consideration. The switch SW10 carries out changeover between a first path which passes the discharger circuit 42a and a second path which does not pass the discharger circuit 42a.

In order to turn on the discharger circuit 42a, the CPU 45 connects the switch SW10 to the first path. Consequently, an output from the switch SW6 is supplied to the switch SW8 through the discharger circuit 42a. In order to turn off the discharger circuit 42a, the CPU 45 connects the switch SW10 to the second path. Consequently, the output from the switch SW6 is supplied directly to the switch SW8 without by way of the discharger circuit 42a.

[Example of the Configuration of the Charger Circuit]

Figure 7:
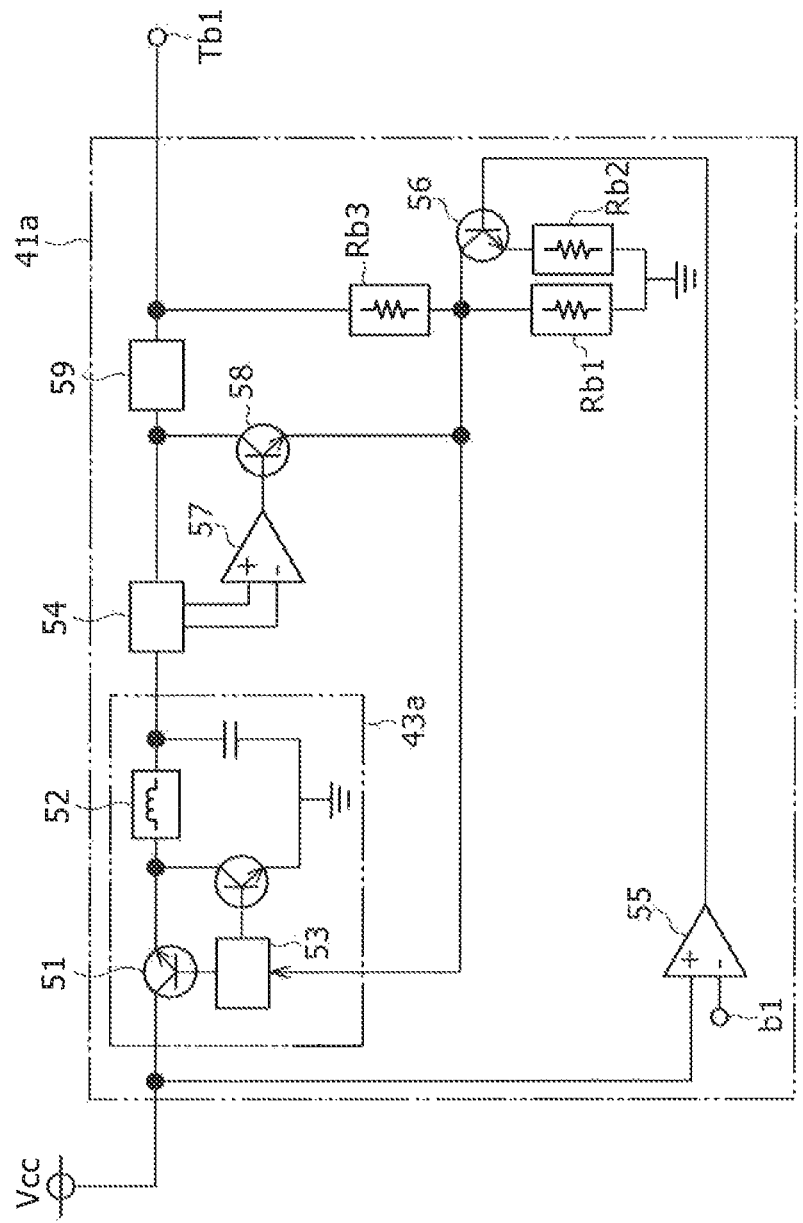
FIG. 7 is a circuit diagram showing an example of a particular configuration of a charger circuit of the battery unit.

FIG. 7 shows an example of a particular configuration of the charger circuit of the battery unit. Referring to FIG. 1, the charger circuit 41a includes a DC-DC converter 43a, and a feedforward controlling system and a feedback controlling system hereinafter described. It is to be noted that, in FIG. 7, the voltage sensor 43b, electronic switch 43c, current sensor 43d, current sensor 43e, electronic switch 43f, voltage sensor 43g, switch SW7 and so forth are not shown.

Also the charger circuits of the battery units BU have a configuration substantially similar to that of the charger circuit 41a shown in FIG. 7.

The DC-DC converter 43a is configured, for example, from a transistor 51, a coil 52, a controlling IC (Integrated Circuit) 53 and so forth. The transistor 51 is controlled by the controlling IC 53.

The feedforward controlling system includes an operational amplifier 55, a transistor 56, and resistors Rb1, Rb2 and Rb3 similarly to the high voltage input power supply circuit 11. An output of the feedforward controlling system is inputted, for example, to a controlling terminal provided on the controlling IC 53 of the DC-DC converter 43a. The controlling IC 53 in the DC-DC converter 43a adjusts the output voltage from the charger circuit 41a so that the input voltage to the controlling terminal may be fixed.

In other words, the feedforward controlling system provided in the charger circuit 41a acts similarly to the feedforward, controlling system provided in the high voltage input power supply circuit 11.

Since the charger circuit 41a includes the feedforward controlling system, the output voltage from the charger circuit 41a is adjusted so that the value thereof may become a voltage value within a range set in advance. Since the value of the output voltage from the charger circuit is adjusted to a voltage value within the range set in advance, the charging current to the batteries B electrically connected to the control unit CU is adjusted in response to a change of the input voltage from the high voltage input power supply circuit 11. Accordingly, the battery units BU which include the charger circuit have a function of a charging apparatus which changes the charge rate to the batteries B.

Since the charge rate to the batteries B electrically connected to the control unit CU is changed, the value of the input voltage to the charger circuits of the battery units BU, or in other words, the value of the output voltage of the high voltage input power supply circuit 11 or the low voltage input power supply circuit 12, is adjusted so as to become a voltage value within the range set in advance.

The input to the charger circuit 41a is an output, for example, from the high voltage input power supply circuit 11 or the low voltage input power supply circuit 12 of the control unit CU described hereinabove. Accordingly, one of the output terminals Te1, Te2, Te3, . . . shown in FIG. 4 and the input terminal of the charger circuit 41a are connected to each other.

As seen in FIG. 7, an output voltage from the charger circuit 41a is extracted through the DC-DC converter 43a, a current sensor 54 and a filter 59. The battery Ba is connected to a terminal Tb1 of the charger circuit 41a. In other words, the output from the charger circuit 41a is used as an input to the battery Ba.

As hereinafter described, the value of the output voltage from each charger circuit is adjusted so as to become a voltage value within the range set in advance in response to the type of the battery connected to the charger circuit. The range of the output voltage from each charger circuit is adjusted by suitably selecting the resistance value of the resistors Rb1, Rb2 and Rb3.

Since the range of the output voltage from each charger circuit is determined individually in response to the type of the battery connected to the charger circuit, the type of the batteries B provided in the battery units BU is not limited specifically. This is because the resistance values of the resistors Rb1, Rb2 and Rb3 in the charger circuits may be suitably selected in response to the type of the batteries B connected thereto.

It is to be noted that, while the configuration wherein the output of the feedforward controlling system is inputted to the controlling terminal of the controlling IC 53 is shown in RIG. 7, the CPU 45 of the battery units BU may supply an input to the controlling terminal of the controlling IC 53. For example, the CPU 45 of the battery unit BU may acquire information relating to the input voltage to the battery unit BU from the CPU 13 of the control unit CU through the signal line SL. The CPU 13 of the control unit CU can acquire information relating to the input voltage to the battery unit BU from a result of measurement of the voltage sensor 11h or the voltage sensor 12g.

In the following, the feedforward controlling system provided in the charger circuit 41a is described.

The input to the non-negated input terminal of the operational amplifier 55 is a voltage obtained by stepping down the input voltage to the charger circuit 41a to kb times, where kb is approximately one several tenth to one hundredth. Meanwhile, the input to the negated input terminal b1 of the operational amplifier 55 is a voltage obtained by stepping down a voltage Vb, which is to be set as a lower limit to the output voltage from the high voltage input power supply circuit 11 or the low voltage input power supply circuit 12, to kb times. The input voltage kb×Vb to the negated input terminal b1 of the operational amplifier 55 is applied, for example, from the CPU 45.

Accordingly, the feedforward controlling system provided in the charger circuit 41a steps up the output voltage from the charger circuit 41a when the input voltage to the charger circuit 41a is sufficiently higher than the fixed voltage Vb determined in advance. Then, when the input voltage to the charger circuit 41a approaches the fixed voltage Vb determined in advance, the feedforward controlling system steps down the output voltage from the charger circuit 41a.

The transistor 56 is disposed so that, when the input voltage to the charger circuit 41a is higher than the predetermined value, the value of the output voltage from the charger circuit 41a may not exceed an upper limit set in advance similarly to the transistor 36 described hereinabove with reference to FIG. 4. It is to be noted that the range of the value of the output voltage from the charger circuit 41a depends upon the combination of the resistance values of the resistors Rb1, Rb2 and Rb3. Therefore, the resistance values of the resistors Rb1, Rb2 and Rb3 are adjusted in response to the type of the batteries B connected to the charger circuits.

Further, the charger circuit 41a includes also the feedback controlling system as described hereinabove. The feedback controlling system is configured, for example, from a current sensor 54, an operational amplifier 57, a transistor 58 and so forth.

If the current amount supplied to the battery Ba exceeds a prescribed value set in advance, then the output voltage from the charger circuit 41a is stepped down by the feedback controlling system, and the current amount supplied to the battery Ba is limited. The degree of the limitation to the current amount to be supplied to the battery Ba is determined in accordance with a rated value of the battery B connected to each charger circuit.

If the output voltage from the charger circuit 41a is stepped down by the feedforward controlling system or the feedback controlling system, then the current amount to be supplied to the battery Ba is limited. When the current amount supplied to the battery Ba is limited, as a result, charging into the battery Ba connected to the charger circuit 41a is decelerated.

Now, different controlling methods are described taking the MPPT control and the control by the voltage tracking method as examples before the cooperation control which may be executed in the embodiment of the present disclosure is described.

[MPPT Control]

First, an outline of the MPPT control is described below.

Figure 8A:
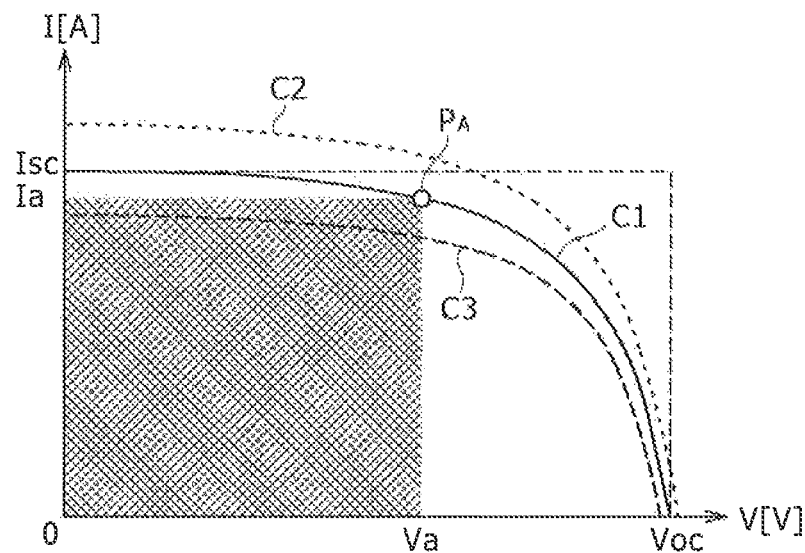
FIG. 8A is a graph illustrating a voltage-current characteristic of a solar cell.

FIG. 8A is a graph illustrating a voltage-current characteristic of a solar cell. In FIG. 8A, the axis of ordinate represents the terminal current of the solar cell and the axis of abscissa represents the terminal voltage of the solar cell. Further, in FIG. 8A, Isc represents an output current value when the terminals of the solar cell are short-circuited while light is irradiated upon the solar cell, and Voc represents an output voltage when the terminals of the solar cell are open while light is irradiated upon the solar cell. The current Isc and the voltage Voc are called short-circuit current and open-circuit voltage, respectively.

As seen in FIG. 8A, when light is irradiated upon the solar cell, the terminal current of the solar cell indicates a maximum value when the terminals of the solar cell are short-circuited. At this time, the terminal voltage of the solar cell is almost 0 V. On the other hand, when light is irradiated upon the solar cell, the terminal voltage of the solar cell exhibits a maximum value when the terminals of the solar cell are open. At this time, the terminal current of the solar cell is substantially 0 A.

It is assumed now that the graph indicative of a voltage-current characteristic of the solar cell is represented by a curve C1 shown in FIG. 8A. Here, if a load is connected to the solar cell, then the voltage and current to be extracted from the solar cell depend upon the power consumption required by the load connected to the solar cell. A point on the curve C1 represented by a set of the terminal voltage and the terminal current of the solar cell at this time is called operating point of the solar cell. It is to be noted that FIG. 8A schematically indicates the position of the operating point but does not indicate the position of an actual operating point. This similarly applies also to an operating point appearing on any other figure of the present disclosure.

If the operating point is changed on the curve representative of a voltage-current characteristic of the solar cell, then a set of a terminal voltage Va and terminal current Ia with which the product of the terminal voltage and the terminal current, namely, the generated electric power, exhibits a maximum value, is found. The point represented by the set of the terminal voltage Va and the terminal current Ia with which the electric power obtained by the solar cell exhibits a maximum value is called optimum operating point of the solar cell.

When the graph indicative of a voltage-current characteristic of the solar cell is represented by the carve C1 illustrated in FIG. 8A, the maximum electric power obtained from the solar cell is determined by the product of the terminal voltage Va and the terminal current Ia which provide the optimum operating point. In other words, when the graph indicating a voltage-current characteristic of the solar cell is represented by the curve C1 illustrated in FIG. 8A, the maximum electric power obtained from the solar cell is represented by the area of a shadowed region in FIG. 8A, namely by Va×Ia. It is to be noted that the amount obtained by dividing Va×Ia by Voc×Isc is a fill factor.

The optimum operating point varies depending upon the electric power required by the load connected to the solar cell, and the point $P_A$ representative of the operating point moves on the curve C1 as the electric power required by the load connected to the solar cell varies. When the electric power amount required by the load is small, the current to be supplied to the load may be lower than the terminal current at the optimum operating point. Therefore, the value of the terminal voltage of the solar cell at this time is higher than the voltage value at the optimum operating point. On the other hand, when the electric power amount required by the load is greater than the electric power amount which can be supplied at the optimum operating point, the electric power amount exceeds the electric power which can be supplied at the illumination intensity at this point of time. Therefore, it is considered that the terminal voltage of the solar cell drops toward 0 V.

Curves C2 and C3 shown in FIG. 8A indicate, for example, voltage-current characteristics of the solar cell when the illumination intensity upon the solar cell varies. For example, the curve C2 shown in FIG. 8A corresponds to the voltage-current characteristic in the case where the illumination intensity upon the solar cell increases, and the curve C3 shown in FIG. 8A corresponds to the voltage-current characteristic in the case where the illumination intensity upon the solar cell decreases.

For example, if the illumination intensity upon the solar cell increases and the curve representative of the voltage-current characteristic of the solar cell changes from the curve C1 to the curve C2, then also the optimum operating point varies in response to the increase of the illumination intensity upon the solar cell. It is to be noted that the optimum operating point at this time moves from a point on the curve C1 to another point on the curve C2.

The MPPT control is nothing but to determine an optimum operating point with respect to a variation of a curve representative of a voltage-current characteristic of the solar cell and control the terminal voltage or terminal current of the solar cell so that electric power obtained from the solar cell may be maximised.

Figure 8B:
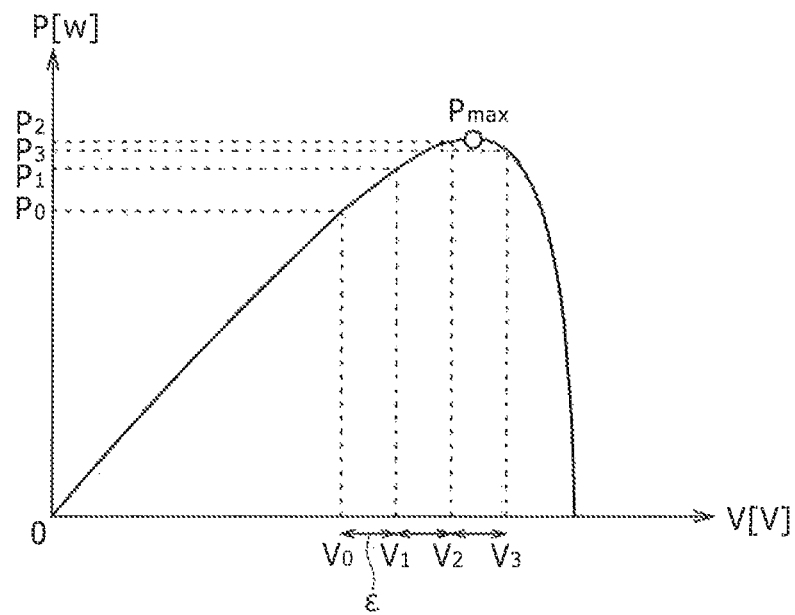
FIG. 8B is a graph, particularly a P-V curve, representative of a relationship between the terminal voltage of the solar cell and the generated electric power of the solar cell in the case where a voltage-current characteristic of the solar cell is represented by a certain curve.

FIG. 8B is a graph, namely, a P-V curve, representative of a relationship between the terminal voltage of the solar cell and the generated electric power of the solar cell in the case where a voltage-current characteristic of the solar cell is represented by a certain curve.

If it is assumed that the generated electric power of the solar cell assumes a maximum value Pmax at the terminal voltage at which the maximum operating point is provided as seen in FIG. 8B, then the terminal voltage which provides the maximum operating point can be determined by a method called mountain climbing method. A series of steps described below is usually executed by a CPU or the like of a power conditioner connected between the solar cell and the power system.

For example, the initial value of the voltage inputted from the solar cell is set to $V_0$, and the generated electric power $P_0$ at this time is calculated first. Then, the voltage to be inputted from the solar cell is incremented by $\epsilon$, which is greater than 0, namely, $\epsilon>0$, to determine the voltage $V_1$ as represented by $V_1=V_0+\epsilon$. Then, the generated electric power $P_1$ when the voltage inputted from the solar cell is $V_1$ is calculated. Then, the generated electric powers $P_0$ and $P_1$ are compared with each other, and if $P_1>P_0$, then the voltage to be inputted from the solar cell is incremented by $\epsilon$ as represented by $V_2=V_1+\epsilon$. Then, the generated electric power $P_2$ when the voltage inputted from the solar cell is $V_2$ is calculated. Then, the resulting generated electric power $P_2$ is compared with the formerly generated electric power $P_1$. Then, if $P_2>P_1$, then the voltage to be inputted from the solar cell is incremented by $\epsilon$ as represented by $V_3=V_2+\epsilon$. Then, the generated electric power $P_3$ when the voltage inputted from the solar cell is $V_3$ is calculated.

Here, if $P_3<P_2$, then the terminal voltage which provides the maximum operating point exists between the voltages $V_2$ and $V_3$. By adjusting the magnitude of $\epsilon$ in this manner, the terminal voltage which provides the maximum operating point can be determined with an arbitrary degree of accuracy. A bisection method algorithm may be applied to the procedure described above. It is to be noted that, if the P-V curve has two or more peaks in such a case that a shade appears locally on the light irradiation face of the solar cell, then a simple mountain climbing method cannot cope with this. Therefore, the control program requires some scheme.

According to the MPPT control, since the terminal voltage can be adjusted such that the load as viewed from the solar cell is always in an optimum state, maximum electric power can be extracted from the solar cell in different weather conditions. On the other hand, analog/digital conversion (A/D conversion) is required for calculation of the terminal voltage which provides the maximum operating point and besides multiplication is included in the calculation. Therefore, time is required for the control. Consequently, the MPPT control cannot sometimes respond to a sudden change of the illumination intensity upon the solar cell in such a case that the sky suddenly becomes cloudy and the illumination intensity upon the solar cell changes suddenly.

[Control by the Voltage Tracking Method]

Here, if the curves C1 to C3 shown in FIG. 8A are compared with each other, then the change of the open voltage Voc with respect to the change of the illumination intensity upon the solar cell, which may be considered a change of a curve representative of a voltage-current characteristic, is smaller than the change of the short-circuit current Isc. Further, all solar cells indicate voltage-current characteristics similar to each other, and it is known that, in the case of a crystal silicon solar cell, the terminal voltage which provides the maximum operating point is found around approximately 80% of the open voltage. Accordingly, it is estimated that, if a suitable voltage value is set as the terminal voltage of the solar cell and the output current of a converter is adjusted so that the terminal voltage of the solar cell becomes equal to the set voltage value, then electric power can be extracted efficiently from the solar cell. Such control by current limitation as just described is called voltage tracking method.

In the following, an outline of the control by the voltage tracking method is described. It is assumed that, as a premise, a switching element is disposed between the solar cell and the power conditioner and a voltage measuring instrument is disposed between the solar cell and the switching element. Also it is assumed that the solar cell is in a state in which light is irradiated thereon.

First, the switching element is switched off, and then when predetermined time elapses, the terminal voltage of the solar cell is measured by the voltage measuring instrument. The reason why the lapse of the predetermined time is waited before measurement of the terminal voltage of the solar cell after the switching off of the switching element is that it is intended to wait that the terminal voltage of the solar cell is stabilized. The terminal voltage at this time is the open voltage Voc.

Then, the voltage value of, for example, 80% of the open voltage Voc obtained by the measurement is calculated as a target voltage value, and the target voltage value is temporarily retained into a memory or the like. Then, the switching element is switched on to start energization of the converter in the power conditioner. At this time, the output current of the converter is adjusted so that the terminal voltage of the solar cell becomes equal to the target voltage value. The sequence of processes described above is executed after every arbitrary interval of time.

The control by the voltage tracking method is high in loss of the electric power obtained by the solar cell in comparison with the MPPT control. However, since the control by the voltage tracking method can be implemented by a simple circuit and is lower in cost, the power conditioner including the converter can be configured at a comparatively low cost.

Figure 9A:
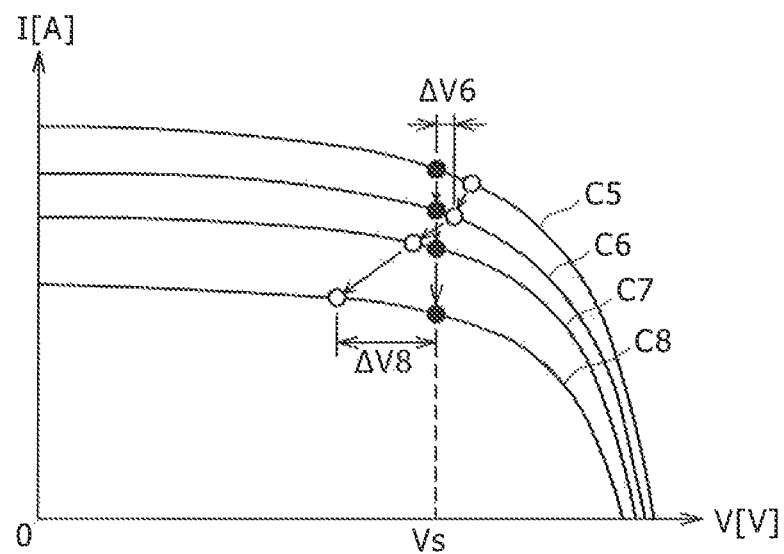
FIG. 9A is a graph illustrating a variation of an operating point with respect to a change of a curve representative of a voltage-current characteristic of a solar cell.

FIG. 9A illustrates a change of the operating point with respect to a change of a curve representative of a voltage-current characteristic of the solar cell. In FIG. 9A, the axis of ordinate represents the terminal current of the solar cell, and the axis of abscissa represents the terminal voltage of the solar cell. Further, a blank round mark in FIG. 9A represents the operating point when the MPPT control is carried out, and a solid round mark in FIG. 9A represents the operating point when control by the voltage tracking method is carried out.

It is assumed now that the curve representative of a voltage-current characteristic of the solar cell is a curve C5. Then, if it is assumed that, when the illumination intensity upon the solar cell changes, the curve representative of the voltage-current characteristic of the solar cell successively changes from the curve C5 to a curve C8. Also the operating points according to the control methods change in response to the change of the curve representative of the voltage-current characteristic of the solar cell. It is to be noted that, since the change of the open voltage Voc with respect to the change of the illumination intensity upon the solar cell is small, in FIG. 9A, the target voltage value when control by the voltage tracking method is carried out is regarded as a substantially fixed value Vs.

As can be seen from FIG. 9A, when the curve representative of the voltage-current characteristic of the solar cell is a curve C6, the degree of the deviation between the operating point of the MPPT control and the operating point of the control by the voltage tracking method is low. Therefore, it is considered that, when the curve representative of the voltage-current characteristic of the solar cell is the curve C6, there is no significant difference in generated electric power obtained by the solar cell between the two different controls.

On the other hand, if the curve representative of the voltage-current characteristic of the solar cell is the curve C8, then the degree of the deviation between the operating point of the MPPT control and the operating point of the control by the voltage tracking method is high. For example, if the differences $\Delta V6$ and $\Delta V8$ between the terminal voltage when the MPPT control is applied and the terminal voltage when the control by the voltage tracking method is applied, respectively, are compared with each other as seen in FIG. 9A, then $\Delta V6 < \Delta V8$. Therefore, when the curve representative of the voltage-current characteristic of the solar cell is the curve C8, the difference between the generated electric power obtained from the solar cell when the MPPT control is applied and the generated electric power obtained from the solar cell when the control by the voltage tracking method is applied is great.

[Cooperation Control of the Control Unit and the Battery Unit]

Now, an outline of cooperation control of the control unit and the battery unit is described. In the following description, control by cooperation or interlocking of the control unit and the battery unit is suitably referred to as cooperation control.

Figure 9B:
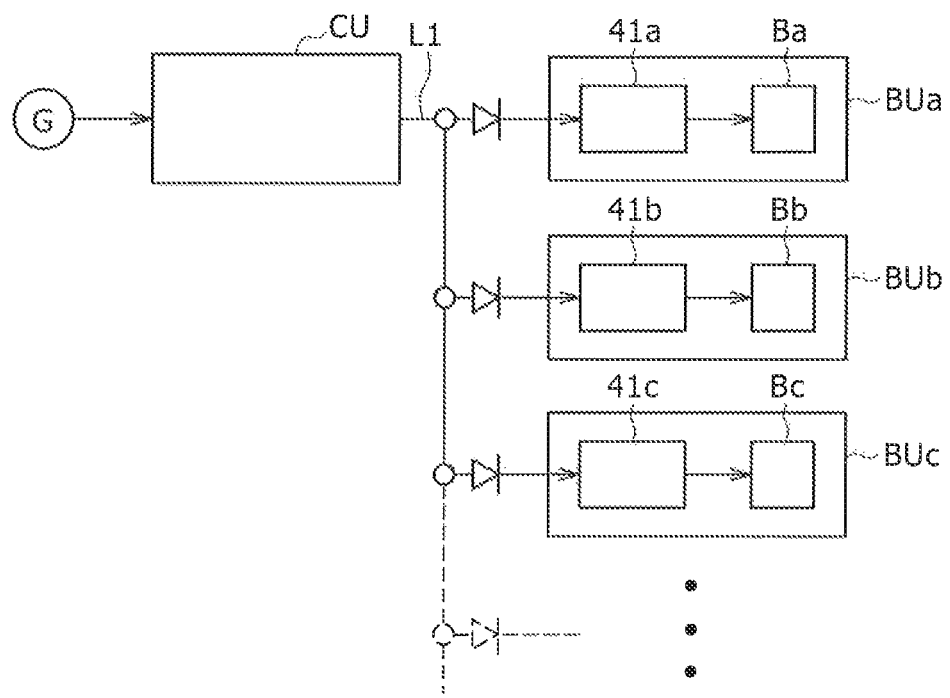
FIG. 9B is a block diagram showing an example of a configuration of a control system wherein cooperation control is carried oat by a control unit and a plurality of battery units.

FIG. 9B shows an example of a configuration of a control system wherein cooperation control by a control unit and a plurality of battery units is carried out.

Referring to FIG. 9B, for example, one or a plurality of battery units BU each including a set of a charger circuit and a battery are connected to the control unit CU. The one or plural battery units BU are connected in parallel to the electric power line L1 as shown in FIG. 9B. It is to be noted that, while only one control unit CU is shown in FIG. 9B, also in the case where the control system includes a plurality of control units CU, one or a plurality of control units CU are connected in parallel to the electric power line L1.

Generally, if it is tried to use electric power obtained by a solar cell to charge one battery, then the MPPT control or the control by the voltage tracking method described above is executed by a power conditioner interposed between the solar cell and the battery. Although the one battery may be configured from a plurality of batteries which operate in an integrated manner, usually the batteries are those of the single type. In other words, it is assumed that the MPPT control or the control by the voltage tracking method described above is executed by a single power conditioner connected between a solar cell and one battery. Further, the number and configuration, which is a connection scheme such as parallel connection or series connection, of batteries which make a target of charging do not change but are fixed generally during charging.

In the meantime, in the cooperation control, the control unit CU and the plural battery units BUa, BUb, BUc, ... carry out autonomous control so that the output voltage of the control unit CU and the voltage required by the battery units BU are balanced well with each other. As described hereinabove, the batteries B included in the battery units BUa, BUb, BUc, ... may be of any types. In other words, the control unit CU according to the present disclosure can carry out cooperation control for a plurality of types of batteries B.

Further, in the configuration example shown in FIG. 9B, the individual battery units BU can be connected or disconnected arbitrarily, and also the number of battery units BU connected to the control unit CU is changeable during electric generation of the solar cell. In the configuration example shown in FIG. 9B, the load as viewed from the solar cell is variable during electric generation of the solar cell. However, the cooperation control can cope not only with a variation of the illumination intensity on the solar cell but also with a variation of the load as viewed from the solar cell during electric generation of the solar cell. This is one of significant characteristics which are not achieved by configurations in related arts.

It is possible to construct a control system which dynamically changes the charge rate in response to the supplying capacity from the control unit CU by connecting the control unit CU and the battery units BU described above to each other. In the following, an example of the cooperation control is described. It is to be noted that, although, in the following description, a control system wherein, in an initial state, one battery unit BUa is connected to the control unit CU is taken as an example, the cooperation control applies similarly also where a plurality of battery units BU are connected to the control unit CU.

It is assumed that, for example, the solar cell is connected to the input side of the control unit CU and the battery unit BUa is connected to the output side of the control unit CU. Also it is assumed that the upper limit to the output voltage of the solar cell is 100 V and the lower limit to the output voltage of the solar cell is desired to be suppressed to 75 V. In other words, it is assumed that the voltage $Vt_0$ is set to $Vt_0 = 75$ V and the input voltage to the negated input terminal of the operational amplifier 35 is $kc \times 75$ V.

Further, it is assumed that the upper limit and the lower limit to the output voltage from the control unit CU are set, for example, to 48 V and 45 V, respectively. In other words, it is assumed that the voltage Vb is set to Vb=45 V and the input voltage to the negated input terminal of the operational amplifier 55 is $kb \times 45$ V. It is to be noted that the value of 48 V which is the upper limit to the output terminal from the control unit CU is adjusted by suitably selecting the resistors Rc1 and Rc2 in the high voltage input power supply circuit 11. In other words, it is assumed that the target voltage value of the output from the control unit CU is set to 48 V.

Further, it is assumed that the upper limit and the lower limit to the output voltage from the charger circuit 41a of the battery unit BUa are set, for example, to 42 V and 28 V, respectively. Accordingly, the resistors Rb1, Rb2 and Rb3 in the charger circuit 41a are selected so that the upper limit and the lower limit to the output voltage from the charger circuit 41a may become 42 V and 28 V, respectively.

It is to be noted that a state in which the input voltage to the charger circuit 41a is the upper limit voltage corresponds to a state in which the charge rate into the battery Ba is 100% whereas another state in which the input voltage to the charger circuit 41a is the lower limit voltage corresponds to a state in which the charge rate is 0%. In particular, the state in which the input voltage to the charger circuit 41a is 48 V corresponds to the state in which, the charge rate into the battery Ba is 100%, and the state in which the input voltage to the charger circuit 41a is 45 V corresponds to the state in which the charge rate into the battery Ba is 0%. In response to the variation within the range of the input voltage from 45 to 48 V, the charge rate is set within the range of 0 to 100%.

It is to be noted that charge rate control into the battery may be carried out in parallel to and separately from the cooperation control. In particular, since constant current charging is carried out at an initial stage of charging, the output from the charger circuit 41a is feedback-adjusted to adjust the charge voltage so that the charge current may be kept lower than fixed current. Then at a final stage, the charge voltage is kept equal to or lower than a fixed voltage. The charge voltage adjusted here is equal to or lower than the voltage adjusted by the cooperation control described above. By the control, a charging process is carried out within the electric power supplied from the control unit CU.

First, a change of the operating point when the cooperation control is carried out in the case where the illumination intensity upon the solar cell changes is described.

Figure 10A:
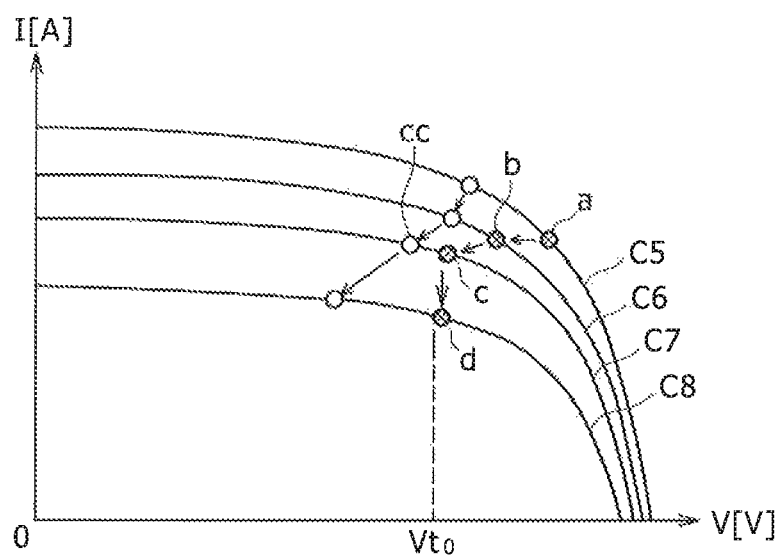
FIG. 10A is a graph illustrating a variation of an operating point when cooperation control is carried out in the case where the illumination intensity upon a solar cell decreases.

FIG. 10A illustrates a change of the operating point when the cooperation control is carried out in the case where the illumination intensity upon the solar cell decreases. In FIG. 10A, the axis of ordinate represents the terminal current of the solar cell and the axis of abscissa represents the terminal voltage of the solar cell. Further, a blank round mark in FIG. 10A represents an operating point when the MPPT control is carried out, and a shadowed round mark in FIG. 10A represents an operating point when the cooperation control is carried out. Curves C5 to C8 shown in FIG. 10A represent voltage-current characteristics of the solar cell when the illumination intensity upon the solar cell changes.

It is assumed now that the electric power required by the battery Ba is 100 W (watt) and the voltage-current characteristic of the solar cell is represented by the curve C5 which corresponds to the most sunny weather state. Further, it is assumed that the operating point of the solar cell at this time is represented, for example, by a point a on the curve C5, and the electric power or supply amount supplied from the solar cell to the battery Ba through the high voltage input power supply circuit 11 and the charger circuit 41a is higher than the electric power or demanded amount required by the battery Ba.

When the electric power supplied from the solar cell, to the battery Ba is higher than the electric power required by the battery Ba, the output voltage from the control unit CU to the battery unit BUa, namely the voltage V12, is 48 V of the upper limit. In particular, since the input voltage to the battery unit BUa is 48 V of the upper limit, the output voltage from the charger circuit 41a of the battery unit BUa is 42 V of the upper limit, and charge into the battery Ba is carried out at the charge rate of 100%. It is to be noted that surplus electric power is abandoned, for example, as heat. It is to be noted that, although it has been described that the charge into the battery is carried out at 100%, the charge into the battery is not limited to 100% but can be adjusted suitably in accordance with a characteristic of the battery.

If the sky begins to become cloudy from this state, then the curve representative of the voltage-current characteristic of the solar cell changes from the curve C5 to the curve C6. As the sky becomes cloudy, the terminal voltage of the solar cell gradually drops, and also the output voltage from the control unit CU to the battery unit BUa gradually drops. Accordingly, as the curve representative of the voltage-current characteristic of the solar cell changes from the curve C5 to the curve C6, the operating point of the solar cell moves, for example, to a point b on the curve C6.

If the sky becomes cloudier from this state, then the curve representative of the voltage-current characteristic of the solar cell changes from the curve C6 to the curve C7, and as the terminal voltage of the solar cell gradually drops, also the output voltage from the control unit CU to the battery unit BUa drops. When the output voltage from the control unit CU to the battery unit BUa drops by some degree, the control system cannot supply the electric power of 100% to the battery Ba any more.

Here, if the terminal voltage of the solar cell approaches $Vt_0=75$ V of the lower limit from 100 V, then the high voltage input power supply circuit 11 of the control unit CU begins to step down the output voltage to the battery unit BUa from 48 V toward Vb=45 V.

After the output voltage from the control unit CU to the battery unit BUa begins to drop, the input voltage to the battery unit BUa drops, and consequently, the charger circuit 41a of the battery unit BUa begins to step down the output voltage to the battery Ba. When the output voltage from the charger circuit 41a drops, the charge current supplied to the battery Ba decreases, and the charging into the battery Ba connected to the charger circuit 41a is decelerated. In other words, the charge rate into the battery Ba drops.

As the charge rate to the battery Ba drops, the power consumption decreases, and consequently, the load as viewed from the solar cell decreases. Consequently, the terminal voltage of the solar cell rises or recovers by the decreased amount of the load as viewed from the solar cell.

As the terminal voltage of the solar cell rises, the degree of the drop of the output voltage from the control unit CU to the battery unit BUa decreases and the input voltage to the battery unit BUa rises. As the input voltage to the battery unit BUa rises, the charger circuit 41a of the battery unit BUa steps up the output voltage from the charger circuit 41a to raise the charge rate into the battery Ba.

As the charge rate into the battery Ba rises, the load as viewed from the solar cell increases and the terminal voltage of the solar cell drops by the increased amount of the load as viewed from the solar cell. As the terminal voltage of the solar cell drops, the high voltage input power supply circuit 11 of the control unit CU steps down the output voltage to the battery unit BUa.

Thereafter, the adjustment of the charge rate described above is repeated automatically until the output voltage from the control unit CU to the battery unit. BUa converges to a certain value to establish a balance between the demand and the supply of the electric power.

The cooperation control is different from the MPPT control in that it is not controlled by software. Therefore, the cooperation control does not require calculation of the terminal voltage which provides a maximum operating point. Further, the adjustment of the charge rate by the cooperation control does not include calculation by a CPU. Therefore, the cooperation control is low in power consumption in comparison with the MPPT control, and also the charge rate adjustment described above is executed in such a short period of time of approximately several nanoseconds to several hundred nanoseconds.

Further, since the high voltage input power supply circuit 11 and the charger circuit 41a merely detect the magnitude of the input voltage thereto and adjust the output voltage, analog/digital conversion is not required and also communication between the control unit CU and the battery unit BUa is not required. Accordingly, the cooperation control does not require complicated circuitry, and the circuit for implementing the cooperation control is small in scale.

Here, it is assumed that, at the point a on the curve C5, the control unit CU can supply the electric power of 100 W and the output voltage from the control unit CU to the battery unit BUa converges to a certain value. Further, it is assumed that the operating point of the solar cell changes, for example, to the point c on the curve C7. At this time, the electric power supplied to the battery Ba becomes lower than 100 W. However, as seen in FIG. 10A, depending upon selection of the value of the voltage $Vt_0$, electric power which is not inferior to that in the case wherein the MPPT control is carried out can be supplied to the battery Ba.

If the sky becomes further cloudy, then the curve representative of the voltage-current characteristic of the solar cell changes from the curve C7 to the curve C8, and the operating point of the solar cell changes, for example, to a point d on the curve C8.

As seen in FIG. 10A, since, under the cooperation control, the balance between the demand and the supply of electric power is adjusted, the terminal voltage of the solar cell does not become lower than the voltage $Vt_0$. In other words, under the cooperation control, even if the illumination intensity on the solar cell drops extremely, the terminal voltage of the solar cell does not become lower than the voltage $Vt_0$ at all.

If the illumination intensity on the solar cell drops extremely, then the terminal voltage of the solar cell comes to exhibit a value proximate to the voltage $Vt_0$, and the amount of current supplied to the battery Ba becomes very small. Accordingly, when the illumination intensity on the solar cell drops extremely, although time is required for charging of the battery Ba, since the demand and the supply of electric power in the control system are balanced well with each other, the control system does not suffer from the system down.

Since the adjustment of the charge rate by the cooperation control is executed in very short time as described above, according to the cooperation control, even if the sky suddenly begins to become cloudy and the illumination intensity on the solar cell decreases suddenly, the system down of the control system can be avoided.

Now, a change of the operating point when the cooperation control is carried out in the case where the load as viewed from the solar cell changes is described.

Figure 10B:
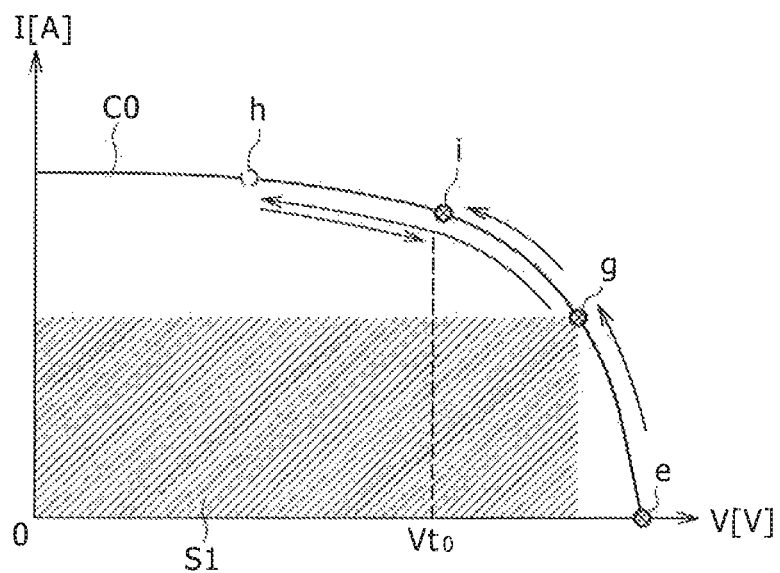
FIG. 10B is a graph illustrating a variation of an operating point when cooperation control is carried out in the case where the load as viewed from the solar cell increases.

FIG. 10B illustrates a change of the operating point when the cooperation control is carried out in the case where the load as viewed from the solar cell increases. In FIG. 10B, the axis of ordinate represents the terminal current of the solar cell and the axis of abscissa represents the terminal voltage of the solar cell. Further, a shadowed round mark in FIG. 10B represents an operating point when the cooperation control is carried out.

It is assumed now that the illumination intensity on the solar cell does not change and the voltage-current characteristic of the solar cell is represented by a curve C0 shown in FIG. 10B.

Immediately after the control system is started up, it estimates that the power consumption in the inside thereof is almost zero, and therefore, the terminal voltage of the solar cell may be considered substantially equal to the open voltage. Accordingly, the operating point of the solar cell immediately after the startup of the control system may be considered existing, for example, at a point e on the curve C0. It is to be noted that the output voltage from the control unit CU to the battery unit BUa may be considered to be 48 V of the upper limit.

After supply of electric power to the battery Ba connected to the battery unit BUa is started, the operating point of the solar cell moves, for example, to a point g on the curve C0. It is to be noted that, since, in the description of the present example, the electric power required by the battery Ba is 100 W, the area of a region S1 indicated by a shadow in FIG. 10B is equal to 100 W.

When the operating point of the solar cell is at the point g on the curve C0, the control system is in a state in which the electric power supplied from the solar cell to the battery Ba through the high voltage input power supply circuit 11 and the charger circuit 41a is higher than the electric power required by the battery Ba. Accordingly, the terminal voltage of the solar cell, the output voltage from the control unit CU and the voltage supplied to the battery Ba when the operating point of the solar cell is at the point g on the curve C0 are 100 V, 48 V and 42 V, respectively.

Here, it is assumed that the battery unit BUb having a configuration similar to that of the battery unit BUa is newly connected to the control unit CU. If it is assumed that the battery Bb connected to the battery unit BUb requires electric power of 100 W for the charge thereof similarly to the battery Ba connected to the battery unit BUa, then the power consumption increases and the load as viewed from the solar cell increases suddenly.

In order to supply totaling electric power of 200 W to the two batteries, the totaling output current must be doubled, for example, while the output voltage from the charger circuit 41a of the battery unit BUa and the charger circuit 41b of the battery unit BUb is maintained.

However, where the power generator is the solar cell, also the terminal voltage of the solar cell drops together with increase of output current from the charger circuits 41a and 41b. Therefore, the totaling output current must be higher than twice in comparison with that in the case when the operating point of the solar cell is at the point g. Therefore, the operating point of the solar cell must be, for example, at a point h on the curve C0 as shown in FIG. 10B, and the terminal voltage of the solar cell drops extremely. If the terminal voltage of the solar cell drops extremely, then the control system may suffer from system down.

In the cooperation control, if the terminal voltage of the solar cell drops as a result of new or additional connection of the battery unit BUb, then adjustment of the balance between the demand and the supply of electric power in the control system is carried out. In particular, the charge rate into the two batteries is lowered automatically so that electric power supplied to the battery Ba and the battery Bb may totally become, for example, 150 W.

In particular, if the terminal voltage of the solar cell drops as a result of new connection of the battery unit BUb, then also the output voltage from the control unit CU to the battery units BUa and BUb drops. If the terminal voltage of the solar cell approaches $Vt_0=75$ V of the lower limit from 100 V, then the high voltage input power supply circuit 11 of the control unit CU begins to step down the output voltage to the battery units BUa and BUb toward Vb=45 V from 48 V.

As the output voltage from the control unit CU to the battery units BUa and BUb is stepped down, the input voltage to the battery units BUa and BUb drops. Consequently, the charger circuit 41a of the battery unit BUa and the charger circuit 41b of the battery unit BUb begin to step down the output voltage to the batteries Ba and Bb, respectively. As the output voltage from the charger circuit drops, the charging into the batteries connected to the charger circuit is decelerated. In other words, the charge rate to each battery is lowered.

As the charge rate into each battery is lowered, the power consumption decrease as a whole, and consequently, the load as viewed from the solar cell decreases and the terminal voltage of the solar cell rises or recovers by an amount corresponding to the decreasing amount of the load as viewed from the solar cell.

Thereafter, adjustment of the charge rate is carried out until the output voltage from the control unit CU to the battery units BUa and BUb converges to a certain value to establish a balance between the demand and the supply of electric power in a similar manner as in the case where the illumination intensity on the solar cell decreases suddenly.

It is to be noted that it depends upon the situation to which value the voltage value actually converges. Therefore, although the value to which the voltage value actually converges is not known clearly, since charging stops when the terminal voltage of the solar cell becomes equal to $Vt_0$=75 V of the lower limit, it is estimated that the voltage value converges to a value a little higher than the value of $Vt_0$ of the lower limit. Further, it is estimated that, since the individual battery units are not controlled in an interlocking relationship with each other, even if the individual battery units have the same configuration, the charge rate differs among the individual battery units due to a dispersion of used elements. However, there is no change in that the battery units can generally be controlled by the cooperation control.

Since the adjustment of the charge rate by the cooperation control is executed in a very short period of time, if the battery unit BUb is connected newly, then the operating point of the solar cell changes from the point g to a point i on the curve C0. It is to be noted that, while a point h is illustrated as an example of the operating point of the solar cell on the curve C0 for the convenience of description in FIG. 10B, under the cooperation control, the operating point of the solar cell does not actually change to the point h.

In this manner, in the cooperation control, the charger circuit of the individual battery units BU detects the magnitude of the input voltage thereto in response to an increase of the load as viewed from the solar cell, and automatically suppresses the current amount to be sucked thereby. According to the cooperation control, even if the number of those battery units BU which are connected to the control unit CU increases to suddenly increase the load as viewed from the solar cell, otherwise possible system down of the control system can be prevented.

Now, a change of the operating point when the cooperation control is carried out in the case where both of the illumination intensity on the solar cell and the load as viewed from the solar cell vary is described.

Figure 11:
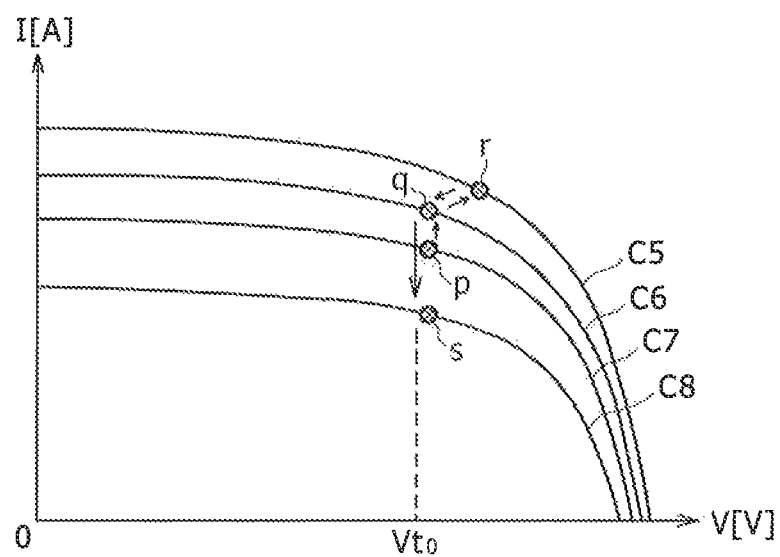
FIG. 11 is a graph illustrating a variation of an operating point when cooperation control is carried out in the case where both of the illumination intensity upon the solar cell and the load as viewed from the solar cell vary.

FIG. 11 illustrates a change of the operating point when the cooperation control is carried out in the case where both of the illumination intensity on the solar cell and the load as viewed from the solar cell vary. In FIG. 11, the axis of ordinate represents the terminal current of the solar cell and the axis of abscissa represents the terminal voltage of the solar cell. A shadowed round mark in FIG. 11 represents an operating point when the cooperation control is carried out. Curves C5 to C8 shown in FIG. 11 indicate voltage-current characteristics of the solar cell in the case where the illumination intensity upon the solar cell varies.

First, it is assumed that the battery unit BUa which includes the battery Ba which requires the electric power of 100 W for the charging thereof is connected to the control unit CU. Also it is assumed that the voltage-current characteristic of the solar cell at this time is represented by a curve C7 and the operating point of the solar cell is represented by a point p on the curve C7.

It is assumed that the terminal voltage of the solar cell at the point p considerably approaches the voltage $Vt_0$ set in advance as a lower limit to the output voltage of the solar cell. That the terminal voltage of the solar cell considerably approaches the voltage $Vt_0$ signifies that, in the control system, adjustment of the charge rate by the cooperation control is executed and the charge rate is suppressed significantly. In particular, in the state in which the operating point of the solar cell is represented by the point p shown in FIG. 11, the electric power supplied to the battery Ba through the charger circuit 41a is considerably higher than the electric power supplied to the high voltage input power supply circuit 11 from the solar cell. Accordingly, in the state in which the operating point of the solar cell is represented by the point p shown in FIG. 11, adjustment of the charge rate is carried out by a great amount, and electric power considerably lower than 100 W is supplied to the charger circuit 41a which charges the battery Ba.

It is assumed that the illumination intensity upon the solar cell thereafter increases and the curve representative of the voltage-current characteristic of the solar cell changes from the curve C7 to the curve C6. Further, it is assumed that the battery unit BUb which has a configuration similar to that of the battery unit BUa is newly connected to the control unit CU. At this time, the operating point of the solar cell changes, for example, from the point p on the curve C7 to a point q on the curve C6.

Since the two battery units are connected to the control unit CU, the power consumption when the charger circuits 41a and 41b fully charge the batteries Ba and Bb is 200 W. However, when the illumination intensity upon the solar cell is not sufficient, the cooperation control is continued and the power consumption is adjusted to a value lower than 200 W such as, for example, to 150 W.

It is assumed here that the sky thereafter clears up and the curve representative of the voltage-current characteristic of the solar cell changes from the curve C6 to the curve C5. At this time, when the generated electric power of the solar cell increases together with the increase of the illumination intensity upon the solar cell, the output current from the solar cell increases.

If the illumination intensity upon the solar cell increases sufficiently and the generated electric power of the solar cell further increases, then the terminal voltage of the solar cell becomes sufficiently higher than the voltage $Vt_0$ at a certain point. If the electric power supplied from the solar cell to the two batteries through the high voltage input power supply circuit 11 and the charger circuits 41a and 41b comes to be higher than the electric power required to charge the two batteries, then the adjustment of the charge rate by the cooperation control is moderated or automatically cancelled.

At this time, the operating point of the solar cell is represented, for example, by a point r on the curve C5 and charging into the individual batteries Ba and Bb is carried out at the charge rate of 100%.

Then, it is assumed that the illumination intensity upon the solar cell decreases and the curve representative of the voltage-current characteristic of the solar cell changes from the curve C5 to the curve C6.

When the terminal voltage of the solar cell drops and approaches the voltage $Vt_0$ set in advance, the adjustment of the charge rate by the cooperation control is executed again. The operating point of the solar cell at this point of time is represented by a point q of the curve C6.

It is assumed that the illumination intensity on the solar cell thereafter decreases further and the curve representative of the voltage-current characteristic of the solar cell changes from the curve C6 to the curve C8.

Consequently, since the charge rate is adjusted so that the operating point of the solar cell may not become lower than the voltage $Vt_0$, the terminal current from the solar cell decreases, and the operating point of the solar cell changes from the point q on the curve C6 to a point s on the curve C8.

In the cooperation control, the balance between the demand and the supply of electric power between the control unit CU and the individual battery units BU is adjusted so that the input voltage to the individual battery units BU may not become lower than the voltage $Vt_0$ determined in advance. Accordingly, with the cooperation control, the charge rate into the individual batteries B can be changed on the real time basis in response to the supplying capacity of the input side as viewed from the individual battery units BU. In this manner, the cooperation control can cope not only with a variation of the illumination intensity on the solar cell but also with a variation of the load as viewed from the solar cell.

As described hereinabove, the present disclosure does not require a commercial power supply. Accordingly, the present disclosure is effective also in a district in which a power supply apparatus or electrical power network is not maintained.

[Load Determination Process and Discharge Controlling Process]

Incidentally, it is assumed that a plurality of battery units are connected in parallel and operate while the output voltages of the batteries of the battery units are different from each other. After the operation is started, usually that one of the batteries which exhibits the highest output voltage comes to discharge and only the specific battery is exhausted. Further, if the battery of the output source is changed over, then the output voltage varies. This variation of the output voltage makes noise to the load or external apparatus which receives supply of the output voltage and may possibly have a bad influence on the load. If the output voltage after the changeover is low and the power consumption of the load is high, then the voltage will drop.

In order to cope with such a problem as just described, cooperative processes may be carried out by and among the battery units to adjust the output voltage. However, in such a case as described as an example in the embodiment of the present disclosure in which a battery can be newly connected or disconnected freely to or from a system, it is actually difficult to carry out cooperative processes among the battery units. Therefore, in the embodiment of the present disclosure, a DC-DC converter is used to adjust the output voltage to a predetermined voltage, for example, to 48 V, as described hereinabove.

Also in the case where a DC-DC converter is used, the output voltages of the battery units sometimes are not equal to each other. For example, such a situation may possibly occur that, when the output voltage of a specific battery unit is higher only by approximately 0.01 V than the output voltages of the other battery units, only the specific battery unit discharges. Naturally, the difference in output voltage may possibly be absorbed in a process of supplying electric power to the load, resulting in normal operation of the battery units. However, in any case, it is very difficult to grasp to which degree each battery discharges and control the discharge amount.

In the system given as an example in the embodiment of the present disclosure, a plurality of battery units are used. The situation of batteries differs among the battery units. For example, the batteries are different from each other in use history, temperature, remaining capacity and so forth. Therefore, it is sometimes demanded to set the discharge amount of a battery of a certain battery unit to a high level because the battery is new or to set the discharge amount of a battery of another battery unit to a low level because the batteries suffer from deterioration. However, since it is very difficult to control the discharge amount for each battery, there is a problem that such a demand as just described cannot be satisfied. Further, since the power consumption of the load is not known, it cannot be determined whether all battery units should be used or only some of the battery units may be used from a relationship to the load.

Therefore, in the embodiment of the present disclosure, for example, a load determination process and a discharge controlling process are carried out so that the demand described above can be satisfied. In the following, the load determination process and the discharge controlling process are described. It is to be noted that the discharge amount is, for example, an electric power amount discharged by a certain battery unit. The discharge amount may otherwise be defined by a period for which a battery unit discharges, namely, by a discharge period. Or the discharge amount may be defined by a distribution rate for each battery unit.

Figure 12:
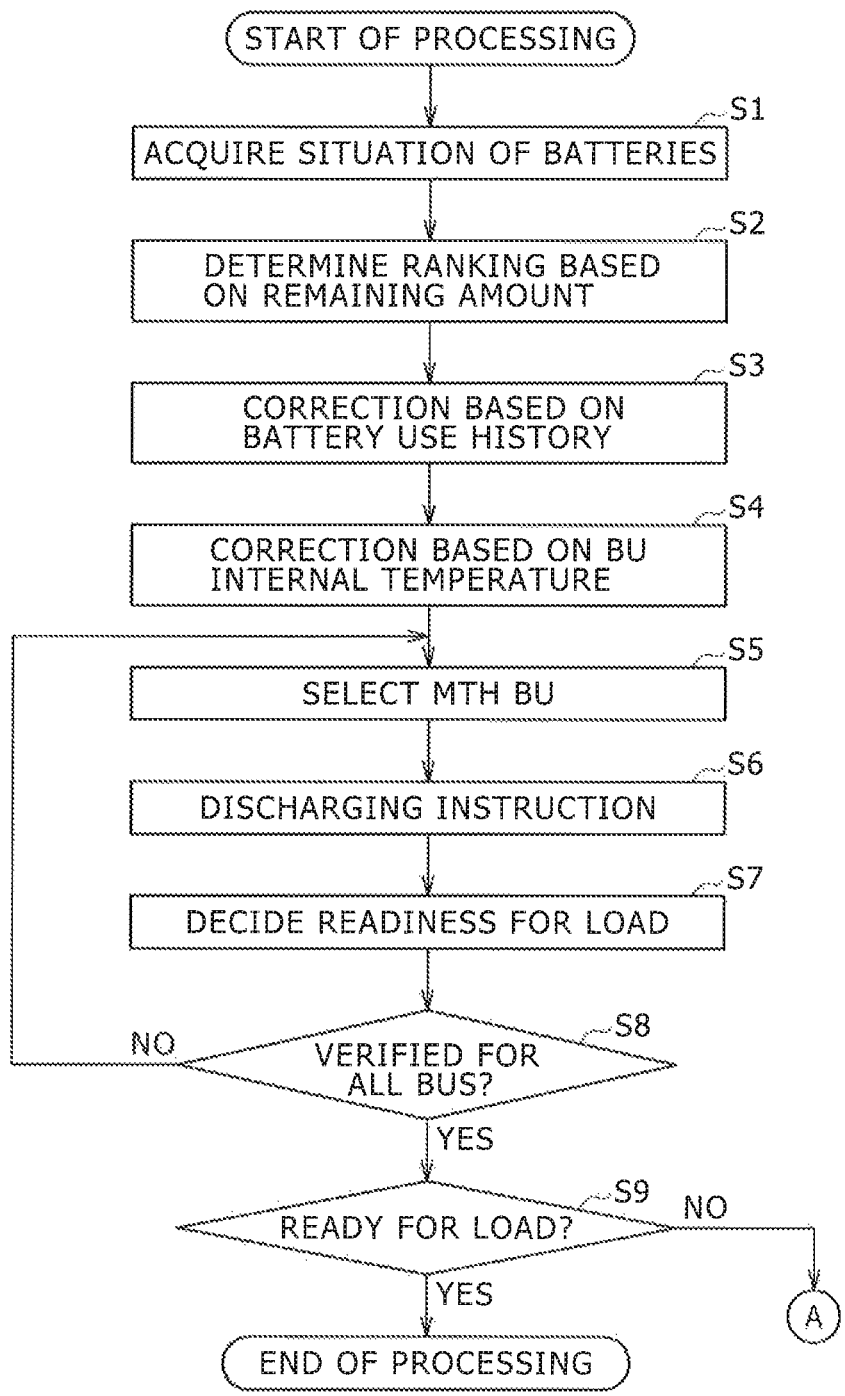
FIGS. 12 and 13 are flow charts illustrating an example of a process for discriminating battery units which share a discharge process.

FIG. 12 is a flow chart illustrating an example of the load determination process. The load determination process is carried out by the control unit CU.

After the processing is started, at step S1, a process of acquiring a situation of the batteries is carried out by the control unit CU. In particular, for example, the CPU 13 of the control unit CU signals, to the CPU 45 of each battery unit BU, a requesting signal for requesting for a situation of the battery B which the battery unit BU has. The requesting signal is transmitted, for example, through the common signal line SL. The requesting signal may otherwise be transmitted with an identifier of each battery unit BU described in the header thereof or may be transmitted by broadcast transmission to all battery units BU without the identifiers of the battery units BU described therein.

In response to the requesting signal, the CPU 45 of each battery unit BU signals a response signal indicative of a situation of the battery B which the battery unit BU has to the control unit CU. The situation of a battery is data indicative of the remaining capacity of the battery, a use history of the battery such as a number of times of charge-discharge operations and a total time period of use, a temperature of the battery and so forth. The response signal is supplied from each battery unit BU to the control unit CU. The control unit CU can acquire the situations of the battery Ba of the battery unit BUa, the battery Bb of the battery unit BUb and the battery 3c of the battery unit BUc based on the response signals. It is to be noted that, in order to avoid collision of the response signals from the battery units BU, the response signals are transmitted one by one after every predetermined interval of time. Then, the processing advances to step S2.

At step S2, ranking in accordance with the remaining capacity of the battery B is carried out. For example, the battery units BU are ranked into the first rank, second rank, third rand, . . . in the descending order of the remaining capacity of a battery B included therein. Here, it is assumed that the first rank is applied to the battery unit BUa; the second rank is applied to the battery unit BUb; and the third rank is applied to the battery unit BUc. Then, the processing advances to step S3.

At steps S3 and S4, a correction process for correcting the ranks determined at step S2 is carried out. In particular, at step S3, a correction process based on the use histories of the batteries is carried out. For example, it is assumed that the difference between the remaining capacities of the battery Ba of the battery unit BUa of the first rank and the battery Bb of the battery unit BUb of the second rank remains within a predetermined range and is small. In such a case as just described, if the use history of the battery Ba is longer than that of the battery Bb, then the first and second ranks are exchanged. Naturally, even if the correction process is carried out, the ranks may not possibly change.

At step S4, a correction process based on the temperature in the battery units BU is carried out. In particular, a correction process is carried out such that, for example, the battery unit BU having a higher temperature may have a lower rank. The processes at steps S2, S3 and S4 may not be executed. Alternatively, at least some of the processes may be executed. Or, another correction process may be additionally carried out based on a parameter which defines a situation of the batteries. For example, a correction process based on the dischargeable electric power amount may be carried out. The correction process may be carried out such that a battery unit having a battery which has a smaller dischargeable electric power amount, or in other words, having a battery which cannot supply discharge current very much, may have a lower rank. Then, the processing advances to step S5.

At step S5, the battery unit BUb to which the first, rank is applied is selected. Then, the processing advances to step S6, at which a discharging instruction is issued from the control unit CU to the battery unit BUb. Since the contents of the process of the discharging instruction are described hereinabove, overlapping description of them is omitted herein to avoid redundancy. It is to be noted that it is assumed that, when the process at step S6 is carried out, for example, a load is connected to an electric power line L4 of the control unit CU and operates. At this time, by what degree the electric power is required by the load, namely, the power consumption of the load, is unknown. Then, the processing advances to step S7.

At step S7, it is decided whether or not the electric power required by the load can be supplied by the battery unit BUb. This process is carried out, for example, by the CPU 13 of the control unit CU monitoring the voltage variation of the voltage V13 supplied to the electric power line L2. Alternatively, the variation of the voltage on the load side may be monitored. Here, as an example of the voltage V13, a DC voltage of 43 V is supplied from the battery unit BUb to the electric power line L2. If the power consumption of the load is high, or in other words, if the load is heavy, then the voltage V13 drops by a great amount. As occasion demands, the voltage V13 disappears. For example, a threshold value is provided such that, when the voltage V13 becomes equal to or lower than the threshold value, it is decided that the battery unit BUb cannot supply the electric power required by the load. If the voltage V13 does not drop or the variation of the V13 remains within a predetermined range, then it is decided that the battery unit BUb can supply the electric power required by the load, and the discharge process of the battery unit BUb is stopped. Then, the processing advances to step S8.

At step S8, it is decided whether or not the process at step S7 has been carried out for all of the battery units BU. If the process has not been carried out in this manner, then the processing returns to step S5. At step S5, the second battery unit BUa is selected. Then at steps S6 and S7, charging instruction to the battery unit BUa and decision of whether or not the electric power required by the load can be supplied are carried out. After the decision, the discharge process of the battery unit BUa is stopped, and the processing advances to step S8.

Then at step S8, it is decided whether or not the process at step S7 has been carried out for all of the battery units BU. If the process has not been carried out, then the processing returns to step S5. At step S5, the third battery unit BUc is selected. Then at steps S6 and S7, charging instruction to the battery unit BUc and decision of whether or not the electric power required by the load can be supplied are carried out. After the decision, the discharge process of the battery unit BUc is stopped, and the processing advances to step S8.

Then at step S8, it is decided whether or not the process at step S7 has been carried out for all of the battery units BU. Since the process at step S7 has been carried out for all of the battery unit BUa, battery unit BUb and battery unit BUc, the processing advances to step S9. At step S9, it is decided whether or not the individual battery units BU can output the electric power required by the load. It all of the battery units BU cannot supply the electric power required by the load, then the processing advances to a process A. It is to be noted that details of the process A are hereinafter described. If at least one of the battery units BU can supply the electric power required by the load, then the processing is ended.

Here, it is assumed that it is decided by the decision at step S7 that, for example, each of the battery unit BUa, battery unit BUb and battery unit BUc can supply the electric power required by the load. In other words, each of the battery unit BUa, battery unit BUb and battery unit BUc is independently ready for the load. However, since the situations of the batteries of the battery unit BUa, battery unit BUb and battery unit BUc are different from one another, in the discharge controlling process hereinafter described, a discharge process is carried out not by a single one of the buttery units but is shared by the three battery units.

It is to be noted that a battery unit with regard to which it is decided by the process at step S7 that it cannot supply the electric power required by the load is not used in the discharge controlling process hereinafter described. For example, it is assumed that it is decided by the process at step S7 that the battery unit BUc cannot supply the electric power required by the load. In this instance, in the discharge controlling process hereinafter described, the battery unit BUc is not used, but the two battery units, namely the battery unit BUa and the battery unit BUb, share and output the electric power required by the load.

While, in the process described above, the decision process at step S7 is carried out for all battery units, the process can be changed, suitably in the following manner. For example, if the current which flows through the electric power line L2 is substantially fixed, then the outputs, namely, the powers, of the battery units BU are substantially same as each other from a relationship to the voltage. In such a case as just described, the decision process at step S7 may be carried out not for all battery units but only for one battery unit.

Also it is possible to modify the process in the following manner. For example, the outputs of the battery units BU are acquired at step S1. At this time, if the outputs of all battery units are substantially equal to each other, then the process may be carry out only for one of the battery units. Further, in order to make the process efficient, the decision process at step S7 may be carried out in order beginning with the battery unit which exhibits the lowest output. If the battery unit which exhibits the lowest output is ready for the load, then also all of the other battery units are ready for the load, and the process at step S7 can be omitted partly. In the case where the process at step S7 is carried out for all battery units, the processes at steps S1 to S3 may be omitted.

Figure 13:
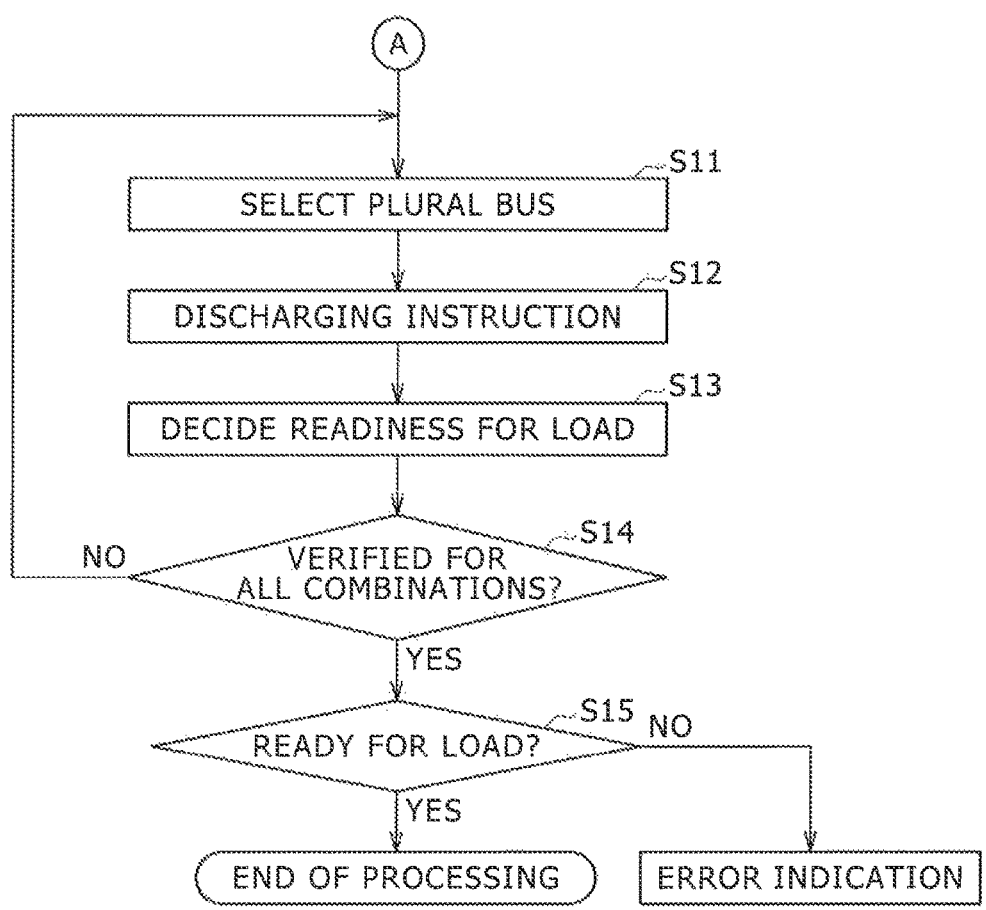

A process when the load determination process advances to the process A is described with reference to a flow chart of FIG. 13. That the process A is carried out signifies that, from such a reason that the load is heavy or from a like reason, a single one of the battery units connected to the load is not ready for the load. Therefore, a plurality of battery units BU are used so as to be ready for the load. At step S11, a plurality of, for example, two, battery units BU are selected. Then, the processing advances to step S12. At step S12, a discharging instruction is issued to two battery units BU, and consequently, the two battery units BU carry out a discharging process. Then, the processing advances to step S13. At step S13, it is decided whether or not the electric power required by the load can be supplied when the two battery units BU are used. Then, the processing advances to step S14.

At step S14, it is decided whether or not all combinations have been checked. Here, since the three battery units, namely, the battery unit BUa, battery unit BUb and battery unit BUc, are used, three combinations are available. If the process at step S13 has not been carried out for all of the combinations, then the processing returns to step S11. Then at step S11, two battery units BU are selected so as to make a different combination. If the process at step S13 has been carried out for all combinations, then the processing advances to step S15.

If the electric power required by the load cannot be supplied by any combination at step S15, then the process A is carried out again. In other words, the three battery units BU are used to carry out a discharge process. If the electric power required by the load cannot be supplied even if the three battery units BU are used, the electric power required by the load cannot be supplied even if all battery units BU are used. In such a case as just described, for example, an error indication is provided or an alarming sound is generated. If it is decided at step S15 that a sufficient supply amount can be assured by at least one of the combinations of the battery units, then the processing is ended.

Even if a load whose power consumption is unknown is newly connected, it can be decided by the process described above by what number of battery units BU should be used for discharge in order to supply the electric power required by the load. Such a complicated process as to decide the power consumption of the load strictly is not required.

Now, the discharge controlling process carried out by the control unit CU is described. FIG. 14 is a flow chart illustrating a flow of the discharge controlling process. Referring to FIG. 14, after the discharge controlling process is started, a process at step S21 is carried out first. At step S21, the control unit CU acquires a situation of the batteries B of the battery units BU. This process is substantially similar to the process at step S1 in FIG. 12, and therefore, overlapping description of the same is omitted herein to avoid redundancy. It is to be noted that the situation for each battery B acquired by the process at step S1 of FIG. 12 may be retained into the memory 15 of the control unit CU. Then, the processing advances to step S22.

At step S22, the CPU 13 of the control unit CU carries out a process of determining the discharge amount for each of the battery units BU connected to the control unit CU. The CPU 13 determines, for example, a ratio by which the battery unit BUa, battery unit BUb and battery unit BUc should discharge. The ratio is hereinafter referred to suitably as discharge distribution ratio (i.e. ratio of a discharge period of the battery unit to the total discharge period of the plurality of battery units to discharge the amount of electric power). In a simple model, this ratio is determined to be %. However, in the embodiment of the present disclosure, the discharge distribution ratio is determined in response to a situation of the batteries B.

For example, the discharge distribution ratio is determined such that a battery unit BU having a battery having a comparatively great remaining capacity, a battery unit BU wherein the number of times of charging into and discharging from a battery is comparatively small, a battery unit BU of a comparative low temperature or a battery unit BU having a comparatively great dischargeable electric power amount outputs a comparatively great discharge amount. Which one of those parameters which define a situation of a battery B is used preferentially can be changed suitably. The parameters may be weighted suitably. Or, the parameters may be ranked for each battery unit BU as at step S2 of FIG. 12 such that the discharge distribution ratio is determined such that the rate at which a battery unit BU having a comparatively high rank discharges may be comparatively high.

The discharge distribution ratio to the battery units is determined in response to the situation of the batteries B. For example, the discharge distribution ratio is determined such that, with respect to the rate of 1 of the battery unit BUc, the rate of the battery unit BUa is 2 and the rate of the battery unit BUb is 3. The discharge distribution ratio may be automatically determined, for example, by the control unit CU or may be determined by the user. Then, the processing advances to step S23.

At step S23, the control unit CU signals an instruction signal representative of a timing for discharge to each of the battery units BU. In the header of the instruction signal, an ID for each battery unit is described. In the part for the instruction contents, namely, command data, of the instruction signal, a timing at which discharge is to be started and a timing at which the discharge is to be ended with reference to a timing at which a synchronizing signal is received are defined. The instruction signals are transmitted through the common signal line SL.

Each of the battery units BU takes in the instruction signal transmitted on the signal line SL and analyzes the header of the instruction signal to decide whether or not the instruction signal is destined for the battery unit BU. If the taken-in instruction signal is destined for the battery unit BU, then the battery unit BU carries out discharge at the timing designated in the instruction signal. The processes on the battery unit BU side described above are carried out, for example, by the CPU 45. For example, a RTC (Real Time Clock) is connected to the CPU 45 of each battery unit BU such that the CPU 45 can determine a timing using time information supplied thereto from the RTC. In this manner, a timing for discharge is set in advance for each battery unit. Consequently, the necessity to signal a controlling signal for discharging instruction from the control unit CU to each battery unit BU for each timing is eliminated, and the processing can be carried out rapidly. Then, the processing advances to step S24.

At step S24, a synchronizing signal is transmitted from the control unit CU to the battery units BU. The synchronizing signal is transmitted by broadcast transmission to the battery unit BUa, battery unit BUb and battery unit BUc, for example, through the common signal line SL. Then, the processing advances to step S25. At step S25, each battery unit BU starts discharge at a predetermined timing in response to the synchronizing signal. Naturally, the synchronizing signal may be transmitted through a line different from the common signal line SL.

Figure 15A:
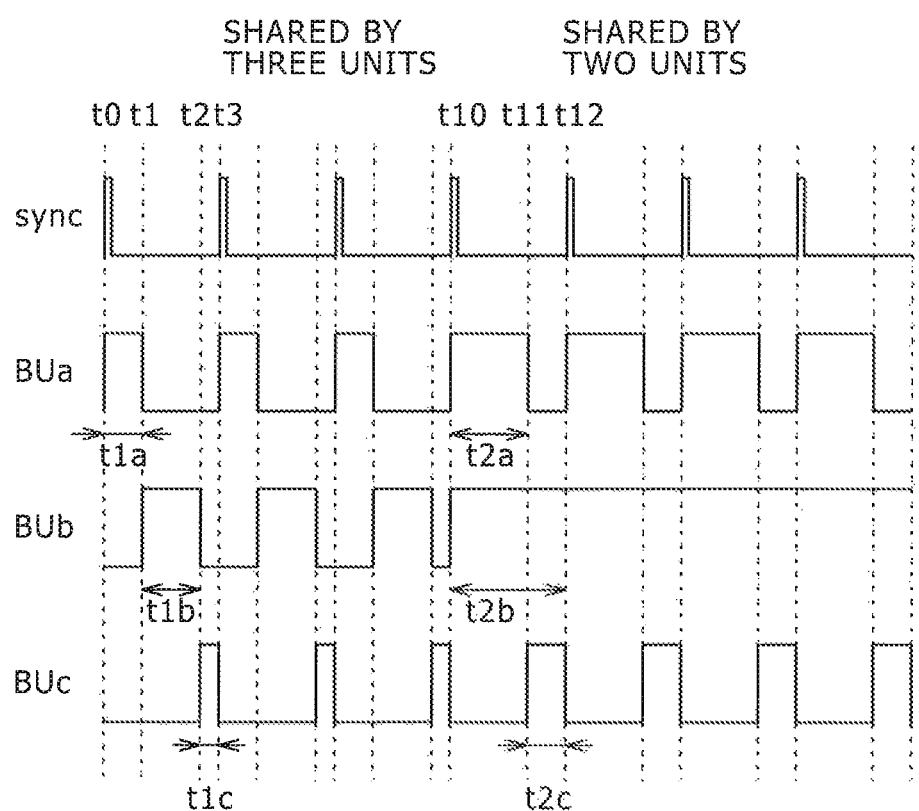
FIGS. 15A and 15B are timing charts illustrating an example of a discharge period for each battery unit.
Figure 15B:
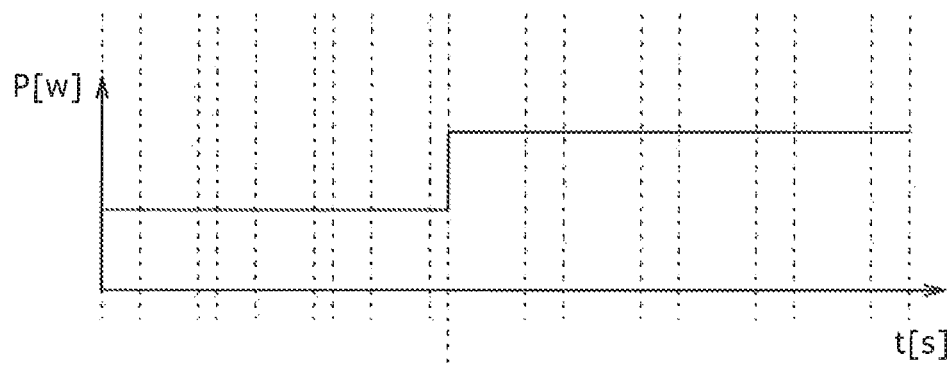

FIG. 15A illustrates an example of a discharge situation of the battery units BU when the discharge process is shared by the three battery units and an example of a discharge situation of the battery units BU when the discharge process is shared by two battery units. The output of each battery unit BU, namely, the height in the graph, in FIG. 15A indicates the level of the voltage. Since the output voltages of the battery units BU are set so as to be equal to, for example, 48 V, the heights representative of the levels of the voltage are substantially equal to each other. FIG. 15B illustrates electric powers in the two cases. It is to be noted that, while the discharge situations in the different cases are shown continuously, there is no necessity to carry out the processes continuously.

First, the example wherein the output of one battery unit is shared by three battery units is described. In response to the synchronizing signal sync supplied at timing t0, for example, the battery unit BUa starts a discharge process. It has been verified by the load determination process described hereinabove that the electric power required by the load can be supplied by the output of the single battery unit BUa.

Discharge from the battery Ba is carried out by the discharge process, and a voltage is outputted from the battery unit BUa. Since details of the discharge process by the battery unit BUa are described hereinabove, overlapping description of the same is omitted herein to avoid redundancy. The battery unit BUa stops the discharge process at timing t1. The timings t0 and t1 are defined by the instruction contents, namely, the command data, of the instruction signal described hereinabove. The battery unit BUa carries out the discharge process for a discharge period denoted by t1a.

At timing t1, the battery unit BUb starts a discharge process. It has been verified by the load determination process described hereinabove that the electric power required by the load can be supplied by the output of the single battery unit BUb. Discharge from the battery Bb is carried out by the discharge process, and a voltage is outputted from the battery unit BUb. The battery unit BUb stops the discharge process at timing t2. The timings t1 and t2 are defined in the instruction contents, namely, in the command data, of the instruction signal described hereinabove. The battery unit BUb carries out the discharge process for a discharge period denoted by t1b.

The battery unit BUc starts a discharge process at timing t2. It has been verified by the load determination process described hereinabove that the electric power required by the load can be supplied by the output of the single battery unit BUc. Discharge from the battery Bc is carried out by the discharge process, and a voltage is outputted from the battery unit BUc. The battery unit BUc stops the discharge process at timing t3. The timings t2 and t3 are defined in the instruction contents, namely, in the command data, of the instruction signal described hereinabove. The battery unit BUc carries out the discharge process for a discharge period denoted by t1c.

The ratio of the discharge periods t1a, t1b and t1c is set to approximately 2:3:1. By setting the discharge period suitably in this manner, the discharge distribution ratio described above can be implemented. At this time, the power supplied to the load corresponds to the output of the substantially one battery unit as seen in FIG. 15B. A next synchronizing signal is supplied from the control unit CU at timing t3, and the discharge process by the battery units BU described above is repeated.

Now, an example wherein the output of two battery units is shared by three battery units is described. Here, it is assumed that, in the process A of the load determination process described hereinabove, it is decided that the electric power required by the load can be supplied, for example, by the combination of the battery unit BUa and the battery unit BUb or the combination of the battery unit BUb and the battery unit BUc. It is to be noted that the ranking and the discharge distribution ratio are set to same as those in the case where the output is shared by three battery units.

The battery unit BUa starts a discharge process in response to a first synchronising signal at timing t10 as seen in FIG. 15A. Then, the battery unit BUa ends the discharge process at timing t1l. In particular, the battery unit BUa discharges for a period from timing t10 to timing t11 as a discharge period t2a. The battery unit. BUb starts a discharge process in response to the first synchronizing signal at timing t10. This discharge process is continued. Within a period from the synchronizing signal supplied at timing t10 to a next synchronizing signal supplied at timing t12, the battery unit BUb discharges for a period from timing t10 to timing t12 as a discharge period t2b. The battery unit BUc starts a discharge process at timing t11. Then, the battery unit BUc ends the discharge process at timing t12. In other words, the battery unit BUc discharges for a period from timing t1l to timing t12 as a discharge period t2c.

The discharge periods t2c and t2a are set substantially to 1:2. Consequently, the ratio among the discharge periods t2a, t2b and t2c is set substantially to 2:3:1. Also in the case where discharge is shared by a plurality of battery units in this manner, the discharge distribution ratio can be determined in response to the situations of the batteries, and a discharge process in accordance with the discharge distribution ratio can be carried out.

The electric power required by the load is shared by the outputs of the two battery units BU. Therefore, the electric power becomes substantially equal to twice as seen in FIG. 15B. It is to be noted that, even when the electric power does not become substantially equal to twice, no problem occurs because it has been verified by the load determination process described hereinabove with reference to FIG. 14 that the electric power required by the load can be supplied.

In this manner, the output to the load can be shared by a plurality of battery units. Further, discharge control for the battery units can be carried out in response to a situation of the batteries which the battery units have.

It is to be noted that, when a battery unit to be used for discharge changes over, there is the possibility that the output may instantaneously decrease to 0 or drop significantly due to a delay in processing or the like. Therefore, discharge periods are preferably set so as to partly overlap with each other. The discharge periods are set such that, in FIGS. 15A and 15B, the discharge periods t1a and t1b overlap with each other, for example, at timing t1.

The process for setting discharge periods so as to overlap with each other is carried out, for example, by the CPU 13. The CPU 13 sets the timing at which the battery unit BUa is to stop its discharge process to a timing a little later in time than timing t1 and sets the timing at which the battery unit BUb is to start its discharge process to a timing a little earlier in time than timing t1. It is to be noted that the CPUs 45 of the battery units BU may carry out such control that they start a discharge process a little earlier than a designated discharge starting timing and stop the discharge process a little later than a designated discharge ending timing.

It is to be noted that, also when the output of one battery unit is ready for the load, if the output of one battery unit does not have a sufficient margin with respect to the power consumption of the load, then two battery units may share the output for the load. Further, for example, when a predetermined battery unit is disconnected or when the electric power required by the load varies, the discharge distribution ratio among the battery units may be changed dynamically.

As described above, even when the power consumption and so forth of the load are unknown, a battery unit or units which share and output the electric power required by the load can be determined. Among the determined battery units, the discharge period and so forth can be changed in response to a situation of batteries which the battery units have. Consequently, it is possible to cope, for example, with a case in which it is desired to use a certain battery unit frequently or suppress use of a certain battery unit to the least frequency.

2. Modifications

Although the embodiment of the present disclosure has been described, the present disclosure is not limited to the embodiment described above but can be modified in various forms. All of the configurations, numerical values, materials and so forth in the present embodiment are mere examples, and the present disclosure is not limited to the configurations and so forth given as the examples. The configurations and so forth given as the examples can be suitably changed within a range within which no technical contradiction occurs.

For example, a variable resistor may be connected to the output side of the DC-DC converter in each battery unit. The resistance value of the variable resistor is suitably varied. If the resistance value of the variable resistor is raised, then the output voltage of, for example, 48 V from the DC-DC converter drops. Consequently, the output voltage from the DC-DC converter or converters which continue to output 48 V is supplied to an external apparatus. In other words, control for allowing only a desired battery unit or units to output a voltage by changing the resistance value of the variable resistor can be implemented.

The control unit and the battery unit in the control system may be portable. The control system described above may be applied, for example, to an automobile or a house.

It is to be noted that the present disclosure may have such configurations as described below.

(1)
A control apparatus, including:
a discrimination section configured to discriminate a plurality of battery units which are to share and output electric power required by a load; and a control section configured to carry out discharge control for the battery units in response to a situation of each of batteries which the battery units individually have.

(2)
The control apparatus according to (1), wherein the control section carries out the discharge control by determining a discharge amount for each of the battery units.

(3)
The control apparatus according to (2), wherein the control section determines a discharge amount for each of the battery units by setting a discharge period with respect to a reference signal.

(4)
The control apparatus according to (3), wherein a discharge period for which a predetermined one of the battery units is to carry out the discharge process and a discharge period for which another one of the battery units is to carry out the discharge process overlap with each other.

(5)
The control apparatus according to any one of (1) to (4), wherein the situation of each of the batteries is at least one of a remaining capacity of the battery, a use history of the battery and a temperature of the battery.

(6)
The control apparatus according to any one of (1) to (5), wherein the discrimination section successively connects the battery units to the load and monitors a voltage supplied from the connected one of the battery units to discriminate the battery unit.

(7)
A control method, including:
discriminating a plurality of battery units which are to share and output electric power required by a load; and
carrying out discharge control for the battery units in response to a situation of each of batteries which the battery units individually have.

(8)
A control system, including:
a plurality of battery units; and
a control apparatus connected to the battery units;
the control apparatus including
a discrimination section configured to discriminate a plurality of battery units which are to share and output electric power required by a load from among the battery units, and
a control section configured to carry out discharge control for the battery units in response to a situation of each of batteries which the battery units individually have.

The present disclosure contains subject matter related to that disclosed in Japanese Priority Patent Application JP 2011-243964 filed in the Japan Patent Office on Nov. 7, 2011, the entire content of which is hereby incorporated by reference.

What is claimed is:
1. A control apparatus, comprising:
a discrimination section configured to discriminate a plurality of battery units,
wherein the plurality of battery units output a discharge amount of electric power required by a load for a total discharge period; and
a control section configured to:
transmit a request signal, to a battery unit of the plurality of battery units, to request a situation of the battery unit;
receive a response signal, from the battery unit of the plurality of battery units, based on the transmitted request signal;

determine a discharge distribution ratio for the battery unit of the plurality of battery units based on the response signal that indicates the situation of the battery unit,
   wherein the discharge distribution ratio for the battery unit is a ratio of a discharge period of the battery unit to the total discharge period of the plurality of battery units to discharge the discharge amount of electric power to the load; and
control a discharge amount of the battery unit of the plurality of battery units based on the determined discharge distribution ratio of the battery unit.

2. The control apparatus according to claim 1, wherein the control section is further configured to determine the discharge period based on the discharge amount of the battery unit.

3. The control apparatus according to claim 1, wherein a first discharge period, for a first battery unit of the plurality of battery units, overlaps with a second discharge period for a second battery unit of the plurality of battery units.

4. The control apparatus according to claim 1, wherein the situation of the battery unit comprises at least one of a use history of the battery unit, a temperature of the battery unit, or a dischargeable electric power amount of the battery unit.

5. The control apparatus according to claim 1, wherein the discrimination section is further configured to:
   connect the battery unit of the plurality of battery units to the load; and
   monitor a voltage, supplied from the connected battery unit of the plurality of battery units, to discriminate the plurality of battery units for discharge.

6. The control apparatus according to claim 1, wherein the control section is further configured to correct a rank of consecutively ranked battery units based on a use history of the battery units.

7. The control apparatus according to claim 1, wherein the control section is further configured to determine the discharge distribution ratio of the battery unit of the plurality of battery units based on the situation of the battery unit.

8. The control apparatus according to claim 7, wherein the situation of the battery unit comprises at least one of a use history of the battery unit, a temperature of the battery unit, or a dischargeable electric power amount of the battery unit.

9. A control system, comprising:
a plurality of battery units; and
a control apparatus connected to the plurality of battery units, wherein the control apparatus comprises:
   a discrimination section configured to discriminate the plurality of battery units, wherein the plurality of battery units output a discharge amount of electric power required by a load for a total discharge period; and
   a control section configured to:
      transmit a request signal, to a battery unit of the plurality of battery units, to request a situation of the battery unit;
      receive a response signal, from the battery unit of the plurality of battery units, based on the transmitted request signal;
      determine a discharge distribution ratio for the battery unit of the plurality of battery units based on the response signal that indicates the situation of the battery unit,
         wherein the discharge distribution ratio for the battery unit is a ratio of a discharge period of the battery unit to the total discharge period of the plurality of battery units to discharge the discharge amount of electric power to the load; and
      control a discharge amount of the battery unit of the plurality of battery units based on the determined discharge distribution ratio of the battery unit.

10. The control system according to claim 9, wherein the control section of the control apparatus is further configured to transmit an instruction signal to the battery unit of the plurality of battery units, wherein the instruction signal comprises:
   identification data that identifies the battery unit of the plurality of battery units, and
   command data that corresponds to a first timing at which the discharge of the battery unit is started and a second timing at which the discharge of the battery unit is stopped.

11. The control system according to claim 10, wherein the battery unit of the plurality of the battery units is configured to:
   analyze the identification data received from the control section of the control apparatus; and
   discharge based on the command data received from the control section,
      wherein the command data corresponds to the identification data of the battery unit.

12. A control method, comprising:
discriminating a plurality of battery units, wherein the plurality of battery units output a discharge amount of electric power required by a load for a total discharge period;
transmitting a request signal to a battery unit of the plurality of battery units for requesting a situation of the battery unit;
receiving a response signal, from the battery unit of the plurality of battery units, based on the transmitted request signal;
determining a discharge distribution ratio for the battery unit of the plurality of battery units based on the response signal that indicates the situation of the battery unit,
   wherein the discharge distribution ratio for the battery unit is a ratio of a discharge period of the battery unit to the total discharge period of the plurality of battery units to discharge the discharge amount of electric power to the load; and
controlling a discharge amount of the battery unit of the plurality of battery units based on the determined discharge distribution ratio of the battery unit.

* * * * *